United States Patent
Hurtado

(10) Patent No.: US 10,371,127 B1
(45) Date of Patent: Aug. 6, 2019

(54) SYSTEM AND METHODS FOR USING TWO REFRIGERANTS IN A MECHANICAL ADVANTAGE SYSTEM AND RECYCLING HEAT

(71) Applicant: Arthur F. Hurtado, Riverside, CA (US)

(72) Inventor: Arthur F. Hurtado, Riverside, CA (US)

( * ) Notice: Subject to any disclaimer, the term of this patent is extended or adjusted under 35 U.S.C. 154(b) by 39 days.

(21) Appl. No.: 15/683,709

(22) Filed: Aug. 22, 2017

Related U.S. Application Data

(63) Continuation-in-part of application No. 14/048,523, filed on Oct. 8, 2013, now Pat. No. 9,784,478, and a continuation-in-part of application No. 13/552,599, filed on Jul. 18, 2012, now abandoned, and a continuation-in-part of application No. 13/530,097, filed on Jun. 21, 2012, now abandoned, and a continuation-in-part of application No. 13/011,729, filed on Jan. 21, 2011, now Pat. No. 8,539,772.

(51) Int. Cl.
   *F03G 7/06* (2006.01)

(52) U.S. Cl.
   CPC .................... *F03G 7/06* (2013.01)

(58) Field of Classification Search
   CPC .. F25B 27/00; F25B 1/02; F25B 11/02; F25B 27/005; F25B 2327/00; F25B 2400/14; F01K 252/08
   See application file for complete search history.

(56) References Cited

U.S. PATENT DOCUMENTS

2013/0180243 A1* 7/2013 Hurtado .................... F03G 7/04
                                                           60/641.6

* cited by examiner

*Primary Examiner* — Elizabeth J Martin

(57) ABSTRACT

Heat is collected by tributary canals formed by the space bounded by the rafters of the roof and by a thermally insulated panel at the bottom and by the roof at the top. The tributary cannels collect and concentrate solar energy that has penetrated the roof. The heat is collected by a plurality of tributary canals, in which solar heat is absorbed. The tributary canals are positioned substantially parallel with a building roofs slope such that the higher ends of the tributary canals are in the proximity of the ridge board of the roof at which a mainstream duct collects hot air arriving through the higher ends of the tributary canals. At the end of the mainstream duct an evaporator box for housing an evaporator is placed with a fan that pulls the hot air from the tributary canals and into the mainstream duct and pushes it onto an evaporator.

20 Claims, 15 Drawing Sheets

SYSTEM AND METHODS FOR USING TWO REFRIGERANTS IN A MECHANICAL ADVANTAGE SYSTEM AND RECYCLING HEAT

CROSS-REFERENCE TO RELATED APPLICATIONS

This application is a continuation in part and claims the benefit of U.S. non-provisional application Ser. No. 14/048,523 filed Oct. 8, 2013 which is This application is also a continuation-in-part and claims the benefit of the U.S. Non-provisional application Ser. No. 13/552,599 filed Jul. 18, 2012 which is a continuation in part of U.S. Non-provisional application Ser. No. 13/530,097 filed Jun. 21, 2012, which is a continuation in part of U.S. Non-provisional application Ser. No. 13/011,729 filed Jan. 21, 2011. All prior filed applications mentioned above are hereby incorporated by reference to the extent that they are not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates generally to air conditioning systems and particularly to air conditioning systems configured to use mechanical leverage induced by the use of two refrigerants having different properties and recycling heat in order to save or produce energy.

2. Description of the Related Art

There is presently an air conditioning system using mechanical advantage. In which the mechanical advantage is derived from the displacement of a greater volume of refrigerant in the expansive side relative to the compressive side of the system. Also, there is a system using mechanical advantage induced by using two refrigerants, having different vapor properties presented by this inventor.

Currently the industry is using conventional two-chamber air conditioning systems using an evaporator, a condenser and a compressor to move refrigerant vapors from the evaporator to the condenser are well known. The problem is that these systems are high consumers of electrical energy, and therefore, economically less and less attractive as energy becomes more and more scarce and expensive.

Attempts were also made to design systems that would capture the heat in the attic or other forms of heat energy for the purpose of using it in air conditioning applications, pool heating, refrigeration applications and electrical energy generation. The problem with these systems is that these systems do not recycle heat to save energy and they are difficult and expensive to build.

Therefore, a new, inexpensive, versatile and more efficient energy saving system using mechanical advantage induced by using two refrigerants, having different properties, and recycling heat is needed to further improve air conditioning using mechanical advantage and take advantage of the abundantly and freely available ambient heat energy, such as heat from the attic, and/or other forms of heat energy such as the renewable solar energy.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

In one embodiment, a mechanical leverage system using in conjunction two refrigerants having a difference of properties such that the differences influences the mechanical advantage ratios of the system.

In another embodiment heat from within the system is recycled to save energy.

In another embodiment heat is collected from a roof by placing collection ducts below the roof to enhance heat absorption and recycle energy.

In another embodiment, a mechanical leverage system using conjunction with temperature differences found in the environment is utilized for air conditioning. The mechanical leverage system provides a means for altering boiling point temperatures of refrigerants in which the system is enabled to absorb and expel heat within the temperature differentials found in the environment.

Suitable heat donors and receivers for this process to proceed are needed. This may be economically obtained through heat differences occurring naturally in our environment. Environmental temperature differences are usually ample in supply. For example, temperatures of 120 degrees F. may be readily obtained by utilizing heat from attic spaces and heat collecting devices such as solar panels and parabolic mirrors. Conversely, cooler ambient air temperatures are also readily obtainable. Hence, an advantage of the system is the ability to use ambient heat and/or solar energy collected from the environment to power an air conditioning installation and, thus, to save energy.

In another embodiment, a mechanical leverage system using refrigerants in conjunction with temperature differences found in the environment is used for collecting heat energy from the environment for the purpose of generating electricity. Thus, an advantage of the system is the ability to convert plentifully available ambient heat energy and/or solar energy into electrical energy.

In another embodiment, input of energy may be applied to augment the system, when necessary to supplement the amount of heat energy collected from the environment.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 13c depicts the perspective view of the return conduit 1302b from FIG. 13a.

DETAILED DESCRIPTION OF THE PREFERRED EMBODIMENTS

Figure 1:
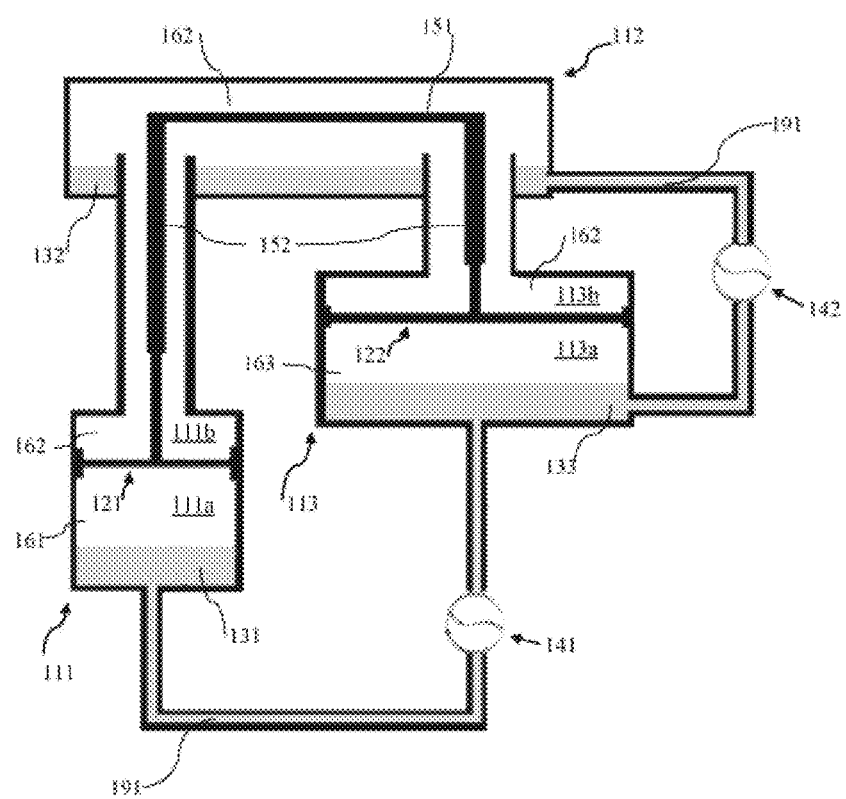
FIG. 1 illustrates a diagrammatic view of an air conditioning system, using mechanical leverage and refrigerant, according to one embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the present invention. Therefore, the scope of the present invention is defined by the accompanying claims and their equivalents.

FIG. 1 illustrates a diagrammatic view of an air conditioning system, using mechanical leverage and refrigerant, according to one embodiment. In general, refrigerants that are suitable for air conditioning consist of refrigerants having substantial latent heat of vaporizations and high vapor pressures with boiling points within the parameters of environmental temperatures. It is to be noted that, for exemplification purposes, in the systems depicted in FIG. 1 and in the subsequent figures the refrigerant used is ammonia ($NH_3$).

The system in FIG. 1 comprises first chamber 111 containing first piston 121, which is configured to have the capability of moving hermetically inside first chamber 111. Hence, first chamber 111 is in effect also a cylinder for first piston 121. Thus, at various times in the system's cycle, first piston 121 effectively divides first chamber 111 into two sub-chambers 111a (first sub-chamber) and 111b (second sub-chamber). Similarly, second piston 122 divides third chamber 113 into sub-chambers 113a (third sub-chamber) and 113b (fourth sub-chamber). Sub-chamber 111a contains ammonia liquid 131 and ammonia vapor 161 at a pressure of 6.15 bars. Sub-chamber 111b contains ammonia vapor 162 at a pressure of 20.33 bars. Second Chamber 112 contains ammonia liquid 132 and ammonia vapor 162 at a pressure of 20.33 bars. Sub-chamber 113b contains ammonia vapor 162 at a pressure of 20.33 bars. Sub-chamber 113a contains ammonia liquid 133 and ammonia vapor 163 at a pressure of 15.54 bars.

It should be understood that the vertical configuration of the two pistons in FIG. 1 is used for illustration purposes only. Other configurations may be used (e.g. horizontal or inclined configurations) without departing from the scope of the invention.

Second sub-chamber 111b communicates with second chamber 112, which contains ammonia vapor 162 at a pressure of 20.33 bars. Next, second chamber 112 communicates with fourth sub-chamber 113b. Finally, third sub-chamber 113a, contains liquid ammonia 133 and ammonia vapors at a pressure of 15.54 bars, and it is configured to communicate controllably with first sub-chamber 111a and second chamber 112, with the aid of counter resistance 141 and pump 142, respectively. The counter resistance 141 may be a release valve, which may be used to release as needed some of the liquid ammonia 133 from third sub-chamber 113a into first sub-chamber 111a. The pump 142 may be used to pump as needed some of the liquid ammonia 133 from third sub-chamber 113a into second chamber 112.

First piston 121 and second piston 122 are communicated by a hydraulic system, comprising hydraulic members 152 and hydraulic hose 151, and are counter balanced against each other. The non-compressible fluid of the hydraulic system transfers pressure from one piston to the other making the actions of the pistons responsive to one another. Thus, it is ensured that, when the equilibrium is disturbed, the distance traveled by first piston 121 is equaled with the distance traveled by second piston 122. The pistons are mechanized by a push/pull action in that the energy from vaporization will push the first piston 121 and, conversely, the energy from condensation will pull the second piston 122.

The balancing of the two pistons is achieved by using a piston system, where second piston 122 has a larger surface area than first piston 121 in order to compensate for pressure differences. It is well established that:

(Difference in pressure 1)×Area 1=(Difference in pressure 2)×Area 2

From the above formula it may be deducted that in a leverage system, if the difference in vapor pressure acting on the first piston is larger than the difference of pressure acting on the second piston, then the surface area of the first piston is smaller than the surface area of the second piston. Furthermore, since the vapor pressure of refrigerants are proportional to temperature, the temperature differential associated with the first piston having the smaller surface area is greater than the temperature differential associated with the second piston having the larger surface area.

Again, for exemplification purposes, let's assume that first sub-chamber 111a contains liquid ammonia 131 at a pressure of 6.15 bars. The boiling point of ammonia at this pressure is 50 degrees Fahrenheit (F). Thus, at the temperature of 50 degrees F. or greater, the liquid ammonia 131 will boil filling with ammonia vapors 161 all available space delimited by the walls of first sub-chamber 111a and first piston 121. The second chamber 112 contains liquid ammonia 132 at a pressure of 20.33 bars. The boiling point of ammonia at this pressure is 122 degrees F. Thus, at the temperature of 122 degrees F. or greater, the liquid ammonia 132 will boil filling with ammonia vapors 162 all available space delimited by first piston 121, the walls of second sub-chamber 111b, the walls of second chamber 112, the walls of fourth sub-chamber 113b, and second piston 122. The third sub-chamber 113a contains liquid ammonia 133 and ammonia vapors 163 at a pressure of 15.54 bars. The boiling point of ammonia at this pressure is 104 degrees F. Thus, at the temperature of 104 degrees F. or lower, the ammonia vapors 163 in third sub-chamber 113a will condense joining the liquid ammonia 133.

To summarize, first sub-chamber 111a contains ammonia at a pressure of 6.15 bars and a temperature of 50 degrees F. At these parameters, one kilogram (kg) of ammonia vapor 161 occupies a volume of 0.2056 cubic meters. Second chamber 112 contains ammonia at a pressure of 20.33 bars and a temperature of 122 degrees F. At these parameters, one kilogram of ammonia vapor 162 occupies a volume of 0.0635 cubic meters. Finally, third sub-chamber 113a contains ammonia at a pressure of 15.54 bars and a temperature of 104 degrees F. At these parameters, one kilogram (kg) of ammonia vapor 163 occupies a volume of 0.0833 cubic meters.

At equilibrium the force exerted on piston 121 equals the force exerted on piston 122:

Force 1=Force 2

If $F=P \times A$, or, $F=\Delta P \times A$, then:

$$(P2-P1) \times A1 = (P2-P3) \times A2; \quad \text{(Eq. 1)}$$

P1 is the pressure (6.15 bars) in first sub-chamber 111a; P2 is the pressure (20.33 bars) in second sub-chamber 111b, second chamber 112 and fourth sub-chamber 113b; P3 is the pressure (15.54 bars) in third sub-chamber 113a; A1 is the surface area of piston 121; A2 is the surface area of piston 122. Then, if, for example, A1=1 sq.meter, then (20.33−6.15)bars×1 sq.meter=(20.33−15.54)bars×A2, or:

14.18=4.79(A2)

It results that, A2=2.96 sq.meters.

Since both pistons are interconnected, if first piston 121 travels 1 meter then second piston 122 also travels 1 meter. This means that:

Work1=Work2, or $$P1 \times V1 = P2 \times V2 \quad \text{(Eq. 2), or}$$

$$P1 \times A1 \times S1 = P2 \times A2 \times S2; \quad \text{(Eq. 3);}$$

S1=S2=1 meter; then, 14.18 bars×1 sq.meter×1 meter=4.79 bars×2.96 sq.meters×1 meter, or 14.18 bars×cubic.meter=14.18 bars×cubic.meter The ammonia in first sub-chamber 111a will boil and absorb heat from the room where it is placed. At 6.15 bars of vapor pressure, the temperature of the ammonia in first sub-chamber 111a is 50 degrees F. The ammonia at this temperature will adequately remove heat from a room where the temperature is greater than 50 degrees F. (for example, 75 degrees F.). As heat is removed from the room into first sub-chamber 111a, the ammonia within it will boil and will tend to equilibrate to the point of saturation. The resulting increase in ammonia vapor pressure (P1) in first sub-chamber 111a will translate into a pushing force exerted on first piston 121.

The second chamber 112 contains ammonia at a pressure of 20.33 bars (P2). Ammonia at this pressure requires a temperature of 122 degrees F. to boil. Heat may be acquired from ambient temperature of the attic, where second chamber 112 may be placed, and/or, from other sources, such as solar panels or reflectors, if needed. The boiling of the ammonia in second chamber 112 will result in an increase of the vapor pressure (P2), which will translate into a pushing force exerted on the first piston 121 and the second piston 122. The force exerted on second piston 122 is greater than the force exerted on first piston 121 due to the surface area of second piston 122 being greater than that of first piston 121. Hence, when, in second chamber 112, the pressure P2, which at system equilibrium is 20.33 bars, increases, the two pistons 121, 122 move clockwise (when looking at the exemplary system depicted in FIG. 1).

Third sub-chamber 113a contains ammonia at a pressure of 15.54 bars (P3) and a temperature of 104 degrees F. The ammonia vapor will condense by loosing heat to the cooler outside ambient air having a temperature of, for example, 95 degrees F. The condensation of the ammonia vapor in third sub-chamber 113a results in a decrease of vapor pressure, and thus, will have a pulling force effect exerted on second piston 122.

As explained later, the pressure/temperature difference between chamber 2 and third sub-chamber chamber 113a may be narrower with the use of the leverage system. The narrowing of this pressure/temperature difference makes it possible for the system to absorb heat and expel heat within the temperature ranges found in the environment. Thus, enabling the refrigerant in second chamber 112 to boil, and subsequently condense in sub-chamber 113a, at narrower pressure/temperature differences between attic and outside ambient air. This is an important advantage as the environmental temperatures are invariably uncontrollable. Hence, it becomes necessary to configure the leverage system to work within these parameters.

First sub-chamber 111a acts as an evaporator and third sub-chamber 113a acts as a condenser. Again, the three interconnected chambers may be placed at different locations. First chamber 111 may be placed inside the space to be cooled, second chamber 112 may be placed in the attic, and third chamber 113 may be place outside. The forces exerted by the actions of the ammonia vapors on piston 121 and piston 122 are transferred between the two pistons by hydraulic pressure hose(s) 151 and the ammonia is transferred among the various chambers by tubing 191.

Each of the three chambers will tend to reach equilibrium with one another, as changes in temperature occur. Either by the process of boiling or condensing, each chamber will strive to maintain vapor pressures corresponding to their respective temperatures and saturation levels. The boiling and condensing of the refrigerant creates a pushing and pulling force on the pistons and drives the system forward.

The specific volume of the ammonia vapors in first sub-chamber 111a is 0.2056 cubic meter/kg and the specific volume of vapor in second chamber 112 is 0.0635 cubic meter/kg. The specific volume of vapor from sub-chamber 111-a to second chamber 112 is decreased by a factor of (0.2056/0.0635) or 3.227. This is equivalent to saying that the density of the ammonia vapors in second chamber 112 is 3.227 times greater than the density of the ammonia vapors in first sub-chamber 111a. The area of second piston 122 is 2.96 greater than the area of first piston 121. Therefore, second piston 122 displaces (3.227×2.96) or 9.5 times more vapor than first piston 121. The production of the required additional vapor takes place in second chamber 112. As discussed, most of the vapor production and heat absorption takes place in second chamber 112. This makes up the greatest portion of the required energy to power the system.

Fortunately, this additional energy, in the form of heat, may be derived from unwanted heat from spaces such as the attic. Higher temperatures may also be readily obtained by utilizing heating devices such as solar panels and parabolic mirrors. Solar heat collectors such as venting canal systems may also be used. Venting canals are made up of insulated panels affixed to the bottom portion of the rafters of a pitched roof. This results in a longitudinal compartment bounded by the adjacent rafters on each side and by the sheathing of the roof on the top and the insulated panels on the bottom. The longitudinal compartment or canal confines the air space below the roofline and concentrates the heat to higher temperatures. The heated air rises, within the canals, to the apex of the roof where the heat is absorbed by the boiling of the refrigerant in second chamber 112.

Second chamber 112 may be in the form of a long tube, containing refrigerant, and may be placed along the apex or ridgeline of the roof, thus, absorbing heat from the attic and/or, for example, venting canals. Hence, the boiling of the refrigerant in the tube is caused by the heat from the attic and/or the venting canals. Thus, this unwanted and abundantly available heat becomes the fuel that powers the cooling system.

There is a two-fold advantage to this process. First, the more heat is absorbed by the refrigerant in second chamber 112, the more heat is also absorbed in first chamber 111, namely its 111a first sub-chamber, and hence, more cooling occurs in the living area. This is because, the higher the temperature in second chamber 112, the greater is the pushing and "pulling" (because of the hydraulic link) effect on second piston 122 and first piston 121, respectively, exercised by the refrigerant gases from second chamber 112. This translates in expanded volume, and thus, lower pressure and lower temperature in first sub-chamber 111a, which means that more heat will be absorbed from the living area. Secondly, the heat that would normally accumulate in the attic and ultimately penetrate the living spaces of a house is diverted and absorbed by second chamber 112 of the cooling system. Consequently, this absorbed heat never has the opportunity to penetrate and heat the inside of the house.

Figure 2:
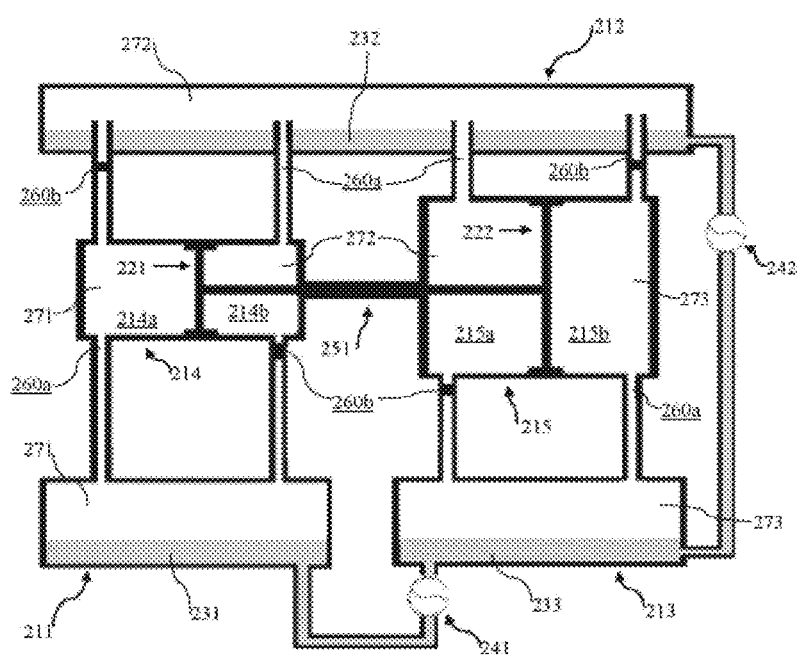
FIG. 2 illustrates a diagrammatic view of an air conditioning system, using mechanical leverage and refrigerant, according to another embodiment.

FIG. 2 illustrates a diagrammatic view of an air conditioning system, using mechanical leverage and refrigerant, according to another embodiment. The pistons and chambers from FIG. 1 are rearranged to arrive at the illustrated configuration of a pumping system that pumps vapor from first chamber 211 into second chamber 212 and ultimately into third chamber 213.

When the system is at equilibrium the parameters of temperature and pressure in the three chambers are maintained and stabilized as earlier described (first chamber 211 contains liquid ammonia 231 and ammonia vapor 271 at a pressure of 6.15 bars (P1) and a temperature of 50 degrees F.; second chamber 212 contains liquid ammonia 232 and ammonia vapor 272 at a pressure of 20.33 bars (P2) and a temperature of 122 degrees F.; third chamber 213 contains liquid ammonia 233 and ammonia vapor 273 at a pressure of 15.54 bars (P3) and a temperature of 104 degrees F.). However, the equilibrium state of the chambers become disturbed as the refrigerant boils in chambers 211 and 212 and condenses in chamber 213. The resultant change of vapor pressure in the chambers pumps the vapor through the system.

Pistons 221 and 222 are adjoined and move together as a unit, pushing the vapor through the system. The connector 251 between the two pistons 221, 222 may be a hydraulic system or link, which may comprise hydraulic member(s), such as a hydraulic piston, and hydraulic hose(s). When the four valves 260a are open and the four valves 260b are closed, as shown in FIG. 2, the two pistons move towards the right. It should be noted that, when the four valves 260a are open and the four valves 260b are closed, the pressure (P1) and the temperature of the refrigerant vapor 271 are the same in the left side 214a (i.e., first sub-chamber) of first cylinder 214 as in first chamber 211; the pressure (P2) and the temperature of the vapor 272 are also the same in the right side 214b (i.e., second sub-chamber) of first cylinder 214, and the left side 215a (i.e., third sub-chamber) of second cylinder 215, as in second chamber 212; finally, the pressure (P3) and the temperature of the vapor 273 are the same in the right side 215b (i.e., fourth sub-chamber) of second cylinder 215 as in third chamber 213. It should be understood that the horizontal configuration of the two pistons in FIG. 2 (and in the subsequent figures), and thus, the associated nomenclature (left side, right side, etc) are used for illustration purposes only. Other configurations may be used (e.g. vertical or inclined configurations) without departing from the scope of the invention.

Figure 3:
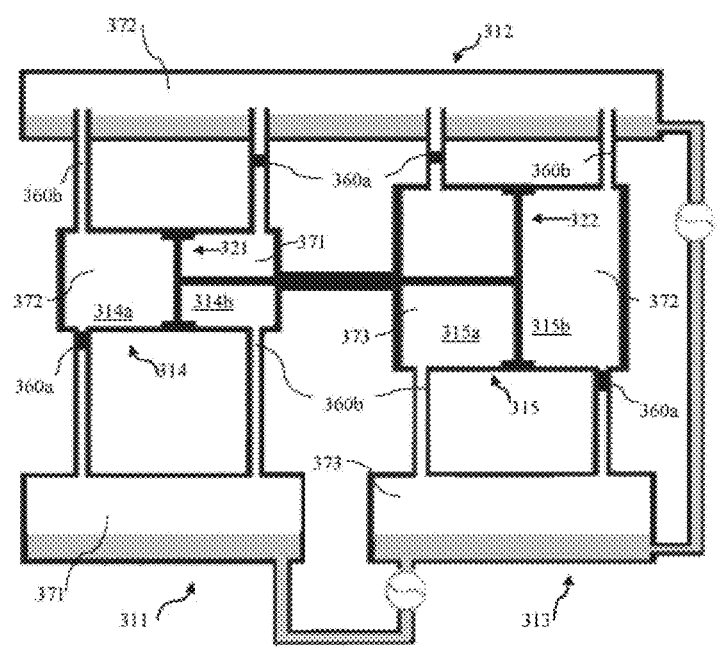
FIG. 3 illustrates a diagrammatic view of the same air conditioning system, using mechanical leverage and refrigerant, as in FIG. 2, except that, the valves that are closed in FIG. 2 are open in FIG. 3, and vice versa.

When the two pistons 221, 222 reach their end point to the right in the respective cylinders 214, 215, an electronic or a mechanical switch for example, close the four valves 260a and open the four valves 260b (as illustrated in FIG. 3 where the same valves are labeled as 360a and 360b, respectively). The polarity of pressure acting upon the system becomes reversed and the two pistons, 321 and 322 (FIG. 3), move to the left. The pressure (P1) and the temperature of the refrigerant vapor 371 (FIG. 3) are the same in the right side 314b (i.e., second sub-chamber) of first cylinder 314 as in first chamber 311; the pressure (P2) and the temperature of the vapor 372 are also the same in the left side 314*a* (i.e., first sub-chamber) of first cylinder 314, and the right side 315*b* (i.e., fourth sub-chamber) of second cylinder 315, as in second chamber 312; finally, the pressure (P3) and the temperature of the vapor 373 are the same in the left side 315*a* (i.e., third sub-chamber) of second cylinder 315 as in third chamber 313.

The cycle repeats when the polarity of pressure reverses again, when the pistons 321, 322 reach the end point to the left. The vapor flows continuously through the system as pistons 321 and 322 oscillate back and forth.

The condensed ammonia liquid in third chamber 213 must be recycled to first chamber 211 and second chamber 212 in proportion to their original amounts. Input of work is required at turbine 242 to pump ammonia liquid from third chamber 213 into second chamber 212, against a pressure difference of 4.79 bars (P2−P3). However, work is gained at turbine 241 as 9.39 bars (P3−P1) of ammonia liquid pressure is released from third chamber 213 into first chamber 211. A counter resistance of 9.39 bars at turbine 241 is necessary to keep the system in equilibrium.

It should be noted that the volume of chambers 211, 212 and 213 are substantially larger than the volume of cylinders 214, 215 so as to create minimal change in pressure in chambers 211, 212 and 213 as the ammonia vapor ingresses and egresses via the opening of valves 260*a* and 260*b*.

If the volume displaced by each stroke of piston 221 equals 1 cubic meter then the volume of each stroke displaced by piston 222 is 2.97 cubic meters. This is because, as it was explained earlier when describing FIG. 1, the surface area of piston 222 is 2.97 times the surface area of piston 221 in order to achieve equilibrium at the given temperature and pressure levels. In addition, as also explained earlier, because of the manner in which pistons 221, 222 are connected to each other, they travel the same distances.

As stated earlier, the specific volume of the ammonia in chamber 211 is 0.2056 cubic meter/kg, which means that its density is 4.86 kg/cubic meter. In chamber 212 the specific volume of the ammonia is 0.0635 cubic meter/kg, which means that its density is 15.74 kg/cubic meter.

From the above, it can be deducted that, with each stroke of 1 cubic meter, the amount of ammonia vapor displaced by first piston 221 is 4.86 kg. In the same time, the amount of ammonia vapor displaced by piston 222 is 46.59 Kg (15.74 kg/cubic meter×2.96 cubic meters). Thus, the ratio of ammonia to be recycled back into chamber 211 and chamber 212 is 4.86/46.59 or 1:9.5, respectively.

The work required to return the liquid ammonia to the respective chambers is a function of its density or volume and the pressure difference of the respective chambers (the specific volume of liquid ammonia is 0.0015 cubic meter/kg):

$$\text{Work}=V(P1-P2)$$

Work Gain (4.86 kg moved from chamber 213 to chamber 211):

$$\text{Work1}=4.86\text{ kg}(0.0015\text{ cubic meter/kg})(6.15-15.54)\text{bars, or}$$

$$\text{Work1}=4.86\text{ kg.}(0.0015\text{ cubic meter/kg})(-9.39)\text{bars, or}$$

$$\text{Work1}=-0.0684\text{ cubic meter}\times\text{bar}$$

Since one part of liquid ammonia (i.e., 4.96 kg) is returned to chamber 211, the difference of 41.73 kg (i.e., 46.59 kg−4.86 kg) is returned to chamber 212.

Work Expended (41.73 kg moved from chamber 213 to chamber 212)

$$\text{Work2}=41.73\text{ kg.}(0.0015\text{ cubic meter/kg})(20.33-15.54)\text{bars, or}$$

$$\text{Work2}=41.73\text{ kg.}(0015\text{ cubic meter/kg})(4.79)\text{bars, or}$$

$$\text{Work2}=0.2998\text{ cubic meter}\times\text{bar}$$

$$\text{Net Work Expended}=(0.2998-0.0684)=0.231\text{ cubic meter}\times\text{bar}$$

Figure 4:
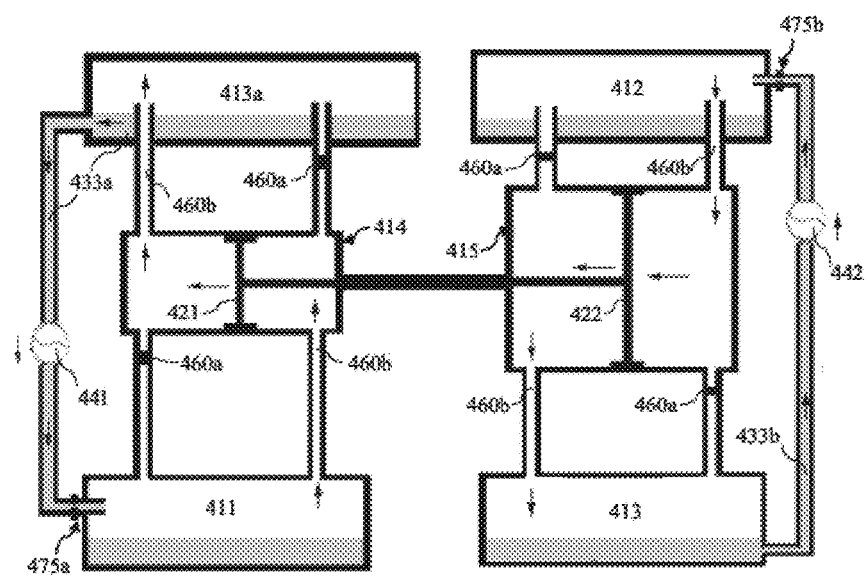
FIG. 4 is a schematic view of a reciprocal piston based mechanical advantage/leverage system comprising two refrigerants with different properties, in accordance with several embodiments.

Referring now to FIG. 4, a schematic view of an improved reciprocal piston based mechanical advantage/leverage systems is depicted, in accordance with several embodiments. Reciprocal piston systems were also described earlier herein when referring for example to FIGS. 2-3. One difference in the system depicted in FIG. 4 is that the system has two evaporators (411, 412) and two condensers (413, 413*a*). It is noted that either piston 421 or piston 422 may be substituted with a rotor type (discussion forthcoming) or any other devise that produces the same means and may be used in conjunction with any of the embodiments discussed herein. A separate evaporator and condenser for the compression side of the system (411, 413*a*) and a separate evaporator and condenser for the expansive side of the system (412, 413). This configuration allows for more flexibility on how to operate the system. For example, as it will be explained in more details below, two types of refrigerants with different properties may be used and kept separate. This is particularly useful when, for example, there is a small differential between the temperature of the attic (or other heat source) and the outside ambient air.

As previously discussed, heat may be obtained from the attic space, or other sources, and converted into useful energy. A mechanical advantage/leverage system used in conjunction with a refrigerant may derive energy from the temperature differences between the attic space or other sources and the outside ambient air for example. This energy may then be leveraged by the mechanical advantage system to run an air conditioning system for example, or other devices (e.g., a generator).

Again, in the reciprocal piston system, two pistons may be interconnected to one another and actuated by the push/pull action of the refrigerant as it vaporizes and condenses. As shown, for the system to create mechanical advantage/leverage, the surface area of the first piston (421; FIG. 4) in cylinder 414 is preferably smaller than the surface area of the second piston (422; FIG. 4) in cylinder 415. In this example piston-cylinder assembly 422/415 acts as an expander and piston-cylinder assembly 421/414 acts as a compressor.

As stated before, it is well established that: (Difference in pressure 1)×Area 1=(Difference in pressure 2)×Area 2. This equation is central to the mechanical leverage system. From this equation it may be deducted that, if the difference in vapor pressure acting on the first piston is larger than the difference of pressure acting on the second piston, then the surface area of the first piston is smaller than the surface area of the second piston. Since the vapor pressure of refrigerants is proportional to their temperature, the temperature differential associated with the first piston, having the smaller surface area, is greater than the temperature differential associated with the second piston, having the larger surface area. Furthermore, increasing the surface area of the second piston in relation to the first piston decreases the pressure/temperature difference necessary to act on the second piston, thus, making it possible for the system to work within the temperature ranges found within the environment (e.g., attic temperature and outside temperature).

As shown in FIG. 4, second piston 422 and first piston 421 move to the left and valves 460a are closed while valves 460b are open. It should be apparent that the process is reversed and both pistons move to the right when valves 460a are open and valves 460b are closed.

In this embodiment, two refrigerants having different vapor pressures at given temperatures may be used to obtain mechanical advantage as described herein below.

The following chart (Chart 1) is an illustration of a mechanical advantage system as depicted in FIG. 4 and using refrigerant R-134a in all four chambers.

CHART 1

(refrigerant R-134a)

| | | |
|---|---|---|
| Chamber 411: | Temperature 60 F. | Pressure 57.4 psi |
| Chamber 412 and 2613a: | Temperature 120 F. | Pressure 171.1 psi |
| Chamber 413: | Temperature 110 F. | Pressure 146.3 psi, | wherein, chamber 411 is the evaporator and chamber 413a is the condenser for the compression side of the system and chamber 412 is the evaporator and chamber 413 is the condenser for the expansion side of the system. As described before, chamber 411 may be placed in a room to extract heat from it, chamber 413 may be placed outside to expel the heat there, and chamber 412 may be placed in the attic to absorb the heat accumulated there or it may be configured to use solar heat or heat from the roof as described earlier herein. The fourth chamber (413a), which is present in the system depicted in FIG. 4, may also be placed outside, to expel the heat there while the refrigerant condensates in it.

Using the parameters listed in Chart 4 and if $A1=1$ unit, and chamber 411 is P1, chamber 412 is P2, chamber 413 is P3 and chamber 413a is P4, we have:

$$(P4-P1)A1=(P2-P3)A2$$

Compressive Side Expansive Side $$(171.1-57.4)\text{psi sq. in.}=(171.1-146.3)\text{psi}\times A2.$$

$$113.7 \text{ psi sq. in.}=24.8 \text{ psi}(A2)$$

$$A2=4.58 \text{ sq in.}$$

Thus, a mechanical advantage of at least 4.58 is required for the system from FIG. 4 to operate using R-134a refrigerant in all four chambers.

The following chart (Chart 2) is an illustration of a similar mechanical advantage system as in FIG. 4 but using refrigerant R-410a instead of R-134a. For the purpose of this illustration, the temperature parameters remain the same. However, the vapor pressure values differ due to the change in refrigerant used.

CHART 2

(refrigerant R-410a)

| | | |
|---|---|---|
| Chamber 411: | Temperature 60 F. | Pressure 170.7 psi |
| Chamber 412 and 2613a: | Temperature 120 F. | Pressure 416.4 psi |
| Chamber 413: | Temperature 110 F. | Pressure 364.1 psi |

Using the parameters listed in Chart 2 and if $A1=1$ unit, we have:

$$(P4-P1)A1=(P2-P3)A2$$

$$(416.4-170.7)\text{psi sq. in.}=(416.4-364.1)\text{psi}\times A2.$$

$$245.7 \text{ psi sq. in.}=52.3 \text{ psi}(A2)$$

$$A2=4.69 \text{ sq in.}$$

Thus, using the same temperature parameters as in Chart 4 (R-134a refrigerant), a mechanical advantage of at least 4.69 is required for the system depicted in FIG. 4 to operate if refrigerant R-410a is used in the system instead of R-134a refrigerant. It should be observed that, the mechanical advantage (4.58) using R-134a is very much similar to that of using R-410a (4.69).

The following chart (Chart 3) is an illustration of a mechanical advantage system depicted in FIG. 4 using a combination of refrigerants, namely using refrigerant R-134a on the compressive side and R-410a on the expansive side. Again, for illustration purposes, the temperature parameters remain the same.

CHART 3

(Refrigerant R-134a and R-410a)

| | | | |
|---|---|---|---|
| Chamber 411: | Temperature 60 F. | Pressure 57.4 psi | Refrigerant R-134a |
| Chamber 412 | Temperature 120 F. | Pressure 416.4 psi | Refrigerant R-410a |
| Chamber 413: | Temperature 110 F. | Pressure 364.1 psi | Refrigerant R-410a |
| Chamber 413a: | Temperature 120 F. | Pressure 171.17 psi | Refrigerant R-134a |

If $A1=1$ unit, we have
Compression Expansion $$(P4-P1)A1=(P2-P3)A2$$

$$(171.1-57.4)\text{psi sq. in.}=(416.4-364.1)\text{psi}\times A2.$$

$$113.7 \text{ psi sq. in.}=52.3 \text{ psi}(A2)$$

$$A2=2.17 \text{ sq in.}$$

Thus, a mechanical advantage of at least 2.17 is required for the system depicted in FIG. 4 to operate if refrigerant R-134a is used on the compressive side and R-410a is used on the expansive side. It should be noted that in using refrigerant R-134a in the expansive portion of the system, particularly in the evaporator in the attic (chamber 412) at 120 F and the condenser (chamber 413) at 110 F yields a pressure difference of (171.1–146.3) psi or 24.8 psi. In comparison, using R-410a in the same expansive system and same temperature parameters, yields a pressure of (416.4–364.1) psi or 52.3 psi. Thus, R-410a refrigerant yields approximately twice (52.3/24.8=2.1 psi) the pressure as the R-134a refrigerant, at the same temperature differential. Typically, refrigerants yielding greater pressure differentials relative to one another with respect to a given temperature differential, produce a greater mechanical advantage. With this in mind, desired mechanical advantages can be obtained by using suitable refrigerants having the appropriate vapor pressure properties.

In the above illustration (Chart 3), using R-134a on the compressive side of the system and using R-410a on the expansive side of the system, only half of the mechanical advantage is required to operate the system as compared to using only one refrigerant for the entire system. This is particularly useful when there is a small differential between the temperature of the attic and the outside ambient air.

The use of two refrigerants with different temperature/vapor pressure properties provides a method for obtaining leverage in which the mechanical advantage is induced chemically rather than the traditional mechanical method, as discussed previously herein, referring in particular wherein mechanical advantage is the result of the expansive side displacing a greater volume of gas than does the compressive side. However, using a combination of both methods (chemically induced and traditional mechanical advantage) would probably be more advantageous in many applications.

The following is an example of a system using both chemically induced mechanical advantage and traditional mechanical advantage. In the previous discussion, the use of two refrigerants, using the parameters listed in chart 3, yield a chemically induced mechanical advantage of 2.17. Incorporating a further increase of volume displacement by the expansive piston 422 relative to the compressive piston 421 of FIG. 4, implements an additional mechanical advantage, (traditional), element. For example, an increase of displacement of piston 422 by a factor of 3, produces a combined chemically induced and traditional mechanical advantage of 2.17×3=6.51. Thus we have a total combined mechanical advantage of 6.51. This discussion does not restrict the ratio of the volume of gas-phase refrigerant displaced by the compressive side versus the expansive side and is not limited to the examples given in this disclosure. The ratio of displacement may be greater, lesser or equal to 1.

Again, having separate condensers for each side, the compression side and the expansive side of the system depicted in FIG. 4, allows for more flexibility to operate the system. As demonstrated in the above illustrations, two types of refrigerants with different properties may be used and kept separate in order to achieve the described benefits. Also as illustrated above, each condenser, either being from the compressive or the expansive side of the system, may operate at different temperature/pressures with respect to one another. This flexibility facilitates easy adaptation of the system to specific applications and conditions.

It is also noted that using two separate condensers when using only one refrigerant may also provide for more flexibility with regard to operating a system. Again as illustrated above, each condenser, either being from the compressive or the expansive side of the system, may operate at different temperature/pressures with respect to one another. For example the refrigerant in condenser 413a on the compressive side of the system may be configured to condense at temperatures different and independent to that of the condenser 413 on the expansive side of the system, depending on the application.

In another embodiment, the system from FIG. 4 implements the use of expansion valves (475a, 475b) in each of the evaporators (chamber 411 and chamber 412). As shown in FIG. 4, liquid refrigerant 433a and 433b is compressed and pumped by pumps 441 and 442, respectively, through the expansion valves 475a and 475b, respectively. To facilitate evaporation, the high pressurized liquid refrigerant 433a and 433b may be in the form of a spray as it is emitted through the expansion valves 475a and 475b, respectively. As the high pressure liquid refrigerant is released into the low pressure evaporator (411 and 412), it quickly evaporates into a gas, absorbing heat from its surroundings at an accelerated rate.

Thus, pump 441 compresses liquid refrigerant 433a to a pressure high enough to cause rapid vaporization of the refrigerant, as it enters the lower pressure of the evaporator 411. In the process, heat is absorbed rapidly from the space (e.g., living space) where the evaporator 411 is placed.

Similarly, pump 442 compresses liquid refrigerant 433b to a pressure high enough to cause rapid vaporization of the refrigerant, as it enters the lower pressure of the evaporator 412. In the process, heat is also absorbed rapidly from the space (e.g., attic) where evaporator 412 is placed.

Figure 5A:
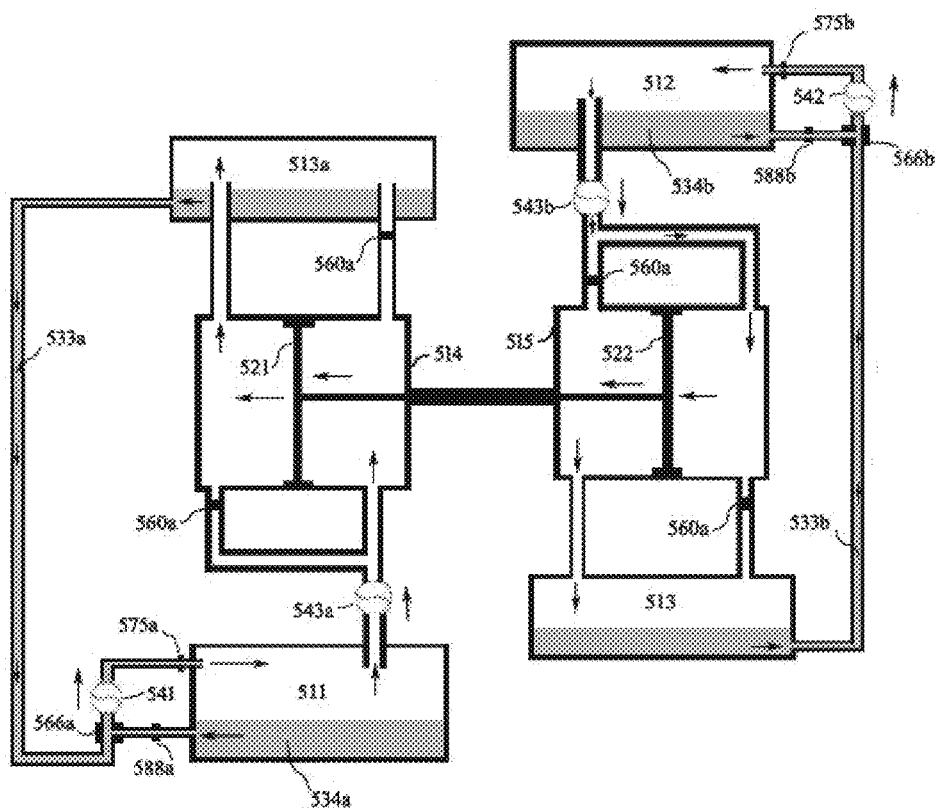
FIGS. 5a-b are schematic views of a reciprocal piston based mechanical advantage/leverage system in different system states, in accordance with other embodiments.
Figure 5B:
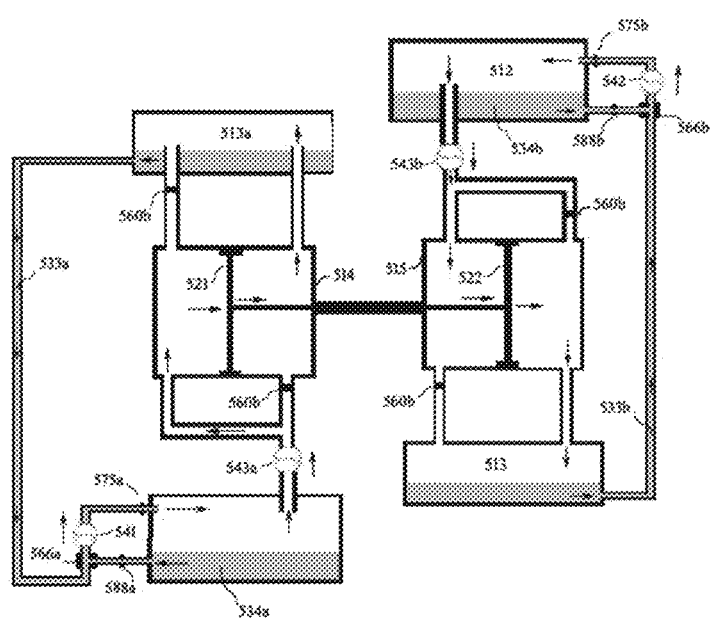

Referring now to FIGS. 5a-b, a schematic view of an improved reciprocal piston based mechanical advantage/leverage systems is depicted, in accordance with other embodiments. The system depicted in FIGS. 5a-b is an improved alternative of the system depicted in FIG. 4 which was described earlier in this disclosure. The improvements and modifications will be described below.

It should be noted that FIGS. 5a-b show the same system in different states. FIG. 5a shows the system when valves 560a are closed while valves 560b (see FIG. 5b for their location) are open, and thus, the two pistons, 521, 522, are moving to the left. FIG. 5b shows the system when valves 560b are closed while valves 560a (see FIG. 5a for their location) are open, and thus, the two pistons, 521, 522, are moving to the right. One-way valves or check valves may be placed near or at valves 560a and valves 560b (not shown here) allowing refrigerant to flow in the appropriate direction and to preclude back flow.

Pumps 541 and 542 compresses liquid refrigerant 533a and 533b to a pressure high enough to cause rapid vaporization of the refrigerant as it is compressed through expansion valves 575a and 675b and enters the lower pressure of evaporator 511 and 512 respectfully. Since the pressure in chamber 512 is higher than that of chamber 513, it is especially important that liquid refrigerant 534b be pumped and compressed from chamber 513 to a substantially higher pressure level than the pressure of chamber 512 in order for liquid refrigerant 534b to undergo a sudden drop in pressure as it is emitted through expansion valve 575b.

In the event the rate of vaporization is not sufficient to fully vaporize the refrigerant emitted from the expansion valve 575b, a recirculating mechanism may be used to pump excess liquid refrigerant that has not vaporized from evaporator 512, using pump 542, and recirculate the un-vaporized liquid refrigerant 534b back through the expansion valve 575b. The r recirculating mechanism also comprises a sensor 588b, located in or near the evaporator 512. When sensor 588b detects an accumulation of liquid refrigerant 534b in evaporator 512, it actuates 3-way valve 566b, in a first position and directs the accumulated liquid refrigerant 534b to be recycled by pumping it through expansion valve 575b and simultaneously preventing the flow of liquid refrigerant 533b from condenser 513. Alternatively, when sensor 588b detects no accumulation of liquid refrigerant 534b in evaporator 512 it actuates 3-way valve 566b in a second position and directs liquid 533b refrigerant from condenser 513 to be pumped through expansion valve 575b and simultaneously preventing the flow of liquid refrigerant 534b from evaporator 512. The liquid refrigerant 5343b being recycled from evaporator 512 will evaporate easier the second time around as it has been preheated Similarly, In the event the rate of vaporization is not sufficient to fully vaporize the refrigerant emitted from the expansion valve 575a, a liquid recycling mechanism may be used to pump excess liquid refrigerant 534a that has not vaporized from evaporator 511, using pump 541, and recycle the un-vaporized liquid refrigerant 534a back through expansion valve 575a. The recycling mechanism also comprises a sensor 588a, located in or near the evaporator 511. When sensor 588a detects an accumulation of liquid refrigerant 534a in evaporator 511, it actuates 3-way valve, 566a, in a first position and directs the accumulated liquid refrigerant 534a to be recycled by pumping it through expansion valve 575a and simultaneously preventing the flow of liquid refrigerant 533a from condenser 513a. Alternatively, when sensor 588a detects no accumulation of liquid refrigerant 534a in evaporator 511 it actuates 3-way valve 566a in a second position and directs liquid refrigerant 533a from condenser 513a to be pumped through expansion valve 575a and simultaneously preventing the flow of liquid refrigerant 534a from evaporator 511.

The recycling mechanism may be implemented in either or both evaporators, (evaporator 511 and evaporator 512). The recycling mechanism described above, including the expansion valve, the sensor, 3-way valve and pump, may also be used in other evaporators, in general, including those used in conventional applications presently used in the industry as well as those used in mechanical advantage systems, as described herein, including those depicted in FIGS. 2,3 4, 6 and 7.

In the event that heat from the sun, for example collected from the attic of a house, is insufficient to raise the temperature level of the refrigerant in evaporator 512, (See FIGS. 5a-5b), to a level of 120 F or high enough to drive the system, external energy may be applied to supplement the system. Wherein, the external energy supplements the work produced between evaporator 512 and condenser 513 and augments the work output of the expander, (in this example depicted by piston-cylinder assembly 522/515). The energy applied may be in the form of compressor 543b, compressing refrigerant vapor from evaporator 512 into piston-cylinder assembly 522/515. Additionally, compressor 541 may augment compression of refrigerant vapor from evaporator 511 into piston-cylinder assembly 521/514. Wherein, the external energy supplements the work required to compress vapor from evaporator 511 to condenser 513a. In this regard augmented energy may be utilized on either the compressive side or the expansive side or both.

In the mechanical advantage/leverage system depicted in FIGS. 5a-b, augmentation, as well as expansion valves and liquid the refrigerant recycling system are used to enhance the mechanical advantage of the system. As previously described in this disclosure, chamber 512 may be located in spaces such as the attic. It comprises an evaporator, and acts as the power source for the system Implementing an augmenting system between chamber 512 and piston/cylinder assembly 522/515, for example, using compressor 543b as described earlier when referring to FIGS. 5a-b, allows the system to operate with a decreased pressure level and hence boiling point of refrigerant 534b in chamber 512. Thus, enabling chamber 512 to absorb heat at lower temperatures. Additionally, the resulting decrease in pressure and boiling point of refrigerant 534b in chamber 512 facilitates and increases the rate at which liquid refrigerant 534b evaporates as it is emitted through expansion valve 575b. Greater rates of evaporation equates to greater heat absorption and cooler attic spaces and ultimately more energy available to drive the system. Additionally, augmentation using compressor 543b also increases the pressure in chamber 513 and thereby increasing the rate of condensation and also helps to drive the system.

In another embodiment, involving replacing the reciprocal piston mechanism with rotary turbines, rotary pumps or scroll pumps. This may be advantageous in that rotary turbines do not require valves, hence, are simpler in design and are more reliable than reciprocal pumps. A two-cycle piston/cylinder system may also be used since it operates using ports and works without the use of valves. It should be noted that many other types of devises resulting in similar means may be used for this application and it is not the intent of this invention to be limited to the methods discussed here or elsewhere.

The same principles described above when referring to the reciprocal piston mechanisms (see description above referring to FIGS. 1-5) are applicable when using instead rotary turbines. An exemplary system, similar to that depicted in and described when referring to FIGS. 5a-b, but in which piston 521 and piston 522 were replaced with rotary turbines 616 and 617, respectively, and augmenting compressor 543b is replaced with augmenting device 643 is shown in FIG. 6.

Figure 6:
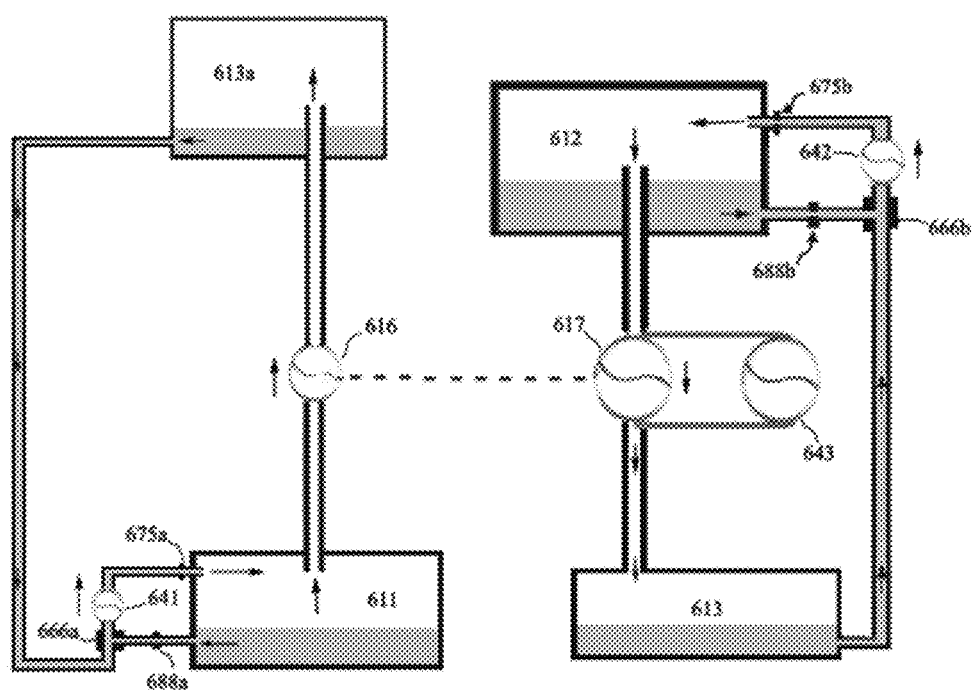
FIG. 6 is a schematic view of a turbine based mechanical advantage/leverage system, in accordance with other embodiments.

Referring to FIG. 6, as in the mechanical leverage system using the reciprocal piston system, rotary turbine 617 displaces larger volumes of refrigerant than rotary turbine 616. In this example rotary turbine 617 acts as an expander and rotary turbine 616 acts as a compressor. The forces acting on the two turbines are interconnected with one another, creating a mechanical advantage system. Hence, at equilibrium, the pressure difference acting upon the smaller rotary turbine 616 is greater than the pressure difference acting upon the larger rotary turbine 617. The two rotary turbines are interconnected by an axle or other means in a manner in which the forces acting on rotary turbine 617 is transferred to rotary turbine 616 and vice versa. In this situation, the smaller rotary turbine 616 acts as a compressor and the larger rotary turbine 617 acts as an expander or pneumatic motor. The pneumatic 617 motor generates energy sufficient to operate the compressor rotor 616. Besides rotary turbines, rotary pumps, scroll pumps and the like may also be used for this application. For the purpose of this disclosure, the term turbine will be adopted, rather than pump, since pump pertains to compression and turbine may pertain to both compression and expansion.

Referring to FIG. 6, the augmenting device/motor 643 may be that of an electric motor powering the expander 617 and in turn driving the compressor 616 of an air conditioner. The augmenting motor 643 may be incorporated or built within expander 617 in that expander 617 and augmenting motor 643 constitute a single unit. Thus, it is to be noted that either the compressor 616 or expander 617 may be either the piston type or rotor type or any other device that produces the same means and may be used in conjunction with any of the embodiments discussed herein.

In general, referring to both piston and rotary systems, it may be advantages that the output of the evaporator 612 should be substantial to be able to produce enough vapor and pressure as to maintain a pushing force on the expander 617. If the augmenting device 643 causes the evacuation of too much vapor from chamber 612, the pressure in chamber 612 will drop to the point where it no longer has a pushing force on the expander 617 and the system becomes powered solely by the augmenting device 643. A regulator (not shown in FIG. 6) may be incorporated to regulate the rate at which the augmenting device 643 causing the evacuation of vapor from chamber 612 such that to turn it off when it reaches a point when the pressure drops to a level that the pushing force of chamber 612 onto the expander 617 becomes ineffective. This type of regulator may also be incorporated in the augmenting device when using the piston type systems described earlier.

The augmenting device 643 has a multi-purpose in that it lowers the pressure, and thus, the boiling point of the refrigerant in chamber 612, and augments the system to be pushed forward.

All other components depicted in FIG. 6 (augmenting devise 643, expansion valves 675a-b, sensors 688a-b, 3-way valves 666a-b, pumps 641 and 642, evaporator 611 and 612 condensers 613 and 613a), have the same role and function the same as described earlier when referring to FIGS. 5a-b.

Similar to the displacement ratio between piston 522 and piston 521, the displacement ratio between expander 617 and compressor 616 is not under any limitation, but may be greater, or less than or equal to 1.

Figure 7:
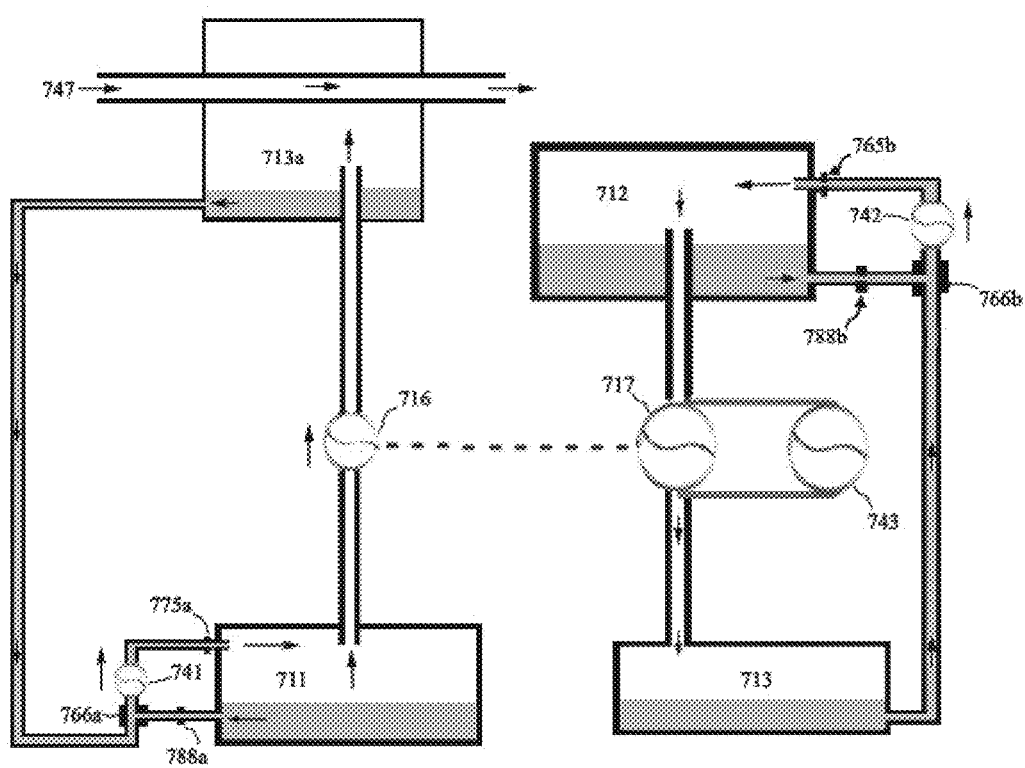
FIG. 7 depicts a mechanical advantage system configured to heat fluid, according to another embodiment.

FIG. 7 depicts a mechanical advantage system, using two refrigerants, coupled to an augmenting device 743 to heat water, according to another embodiment. This system comprises two evaporators (712 and 711) and two condensers (713 and 713a). The first evaporator (chamber 712) and the second evaporator (chamber 711) may be placed in a space where surplus heat is available, such as an attic. The first condenser (chamber 713) may be placed outside the building and the second condenser (chamber 713a) heats cool, piped in water 747. As the refrigerant in chamber 713a condenses, it gives off heat to the cool water 747 that is piped in, and continues heating the water 747 as it passes through the condenser 713a. Condensed liquid refrigerant 733a is recycled and pumped from chamber 713a to chamber 711 by pump 741 and condensed refrigerant 713b from chamber 713 to chamber 712 by pump 742.

The following chart (Chart 4) is an illustration of a mechanical advantage system depicted in FIG. 7 using a combination of refrigerants, namely using refrigerant R-134a on the compressive side and R-410a on the expansive side.

CHART 4

(Refrigerant R-134a and R-410a)

| | | | |
|---|---|---|---|
| Chamber 711: | Temperature 60 F. | Pressure 57.4 psi | Refrigerant R-134a |
| Chamber 712 | Temperature 120 F. | Pressure 416.4 psi | Refrigerant R-410a |
| Chamber 713: | Temperature 110 F. | Pressure 364.1 psi | Refrigerant R-410a |
| Chamber 713a: | Temperature 120 F. | Pressure 171.17 psi | Refrigerant R-134a |

If $A1=1$ unit, we have $$(P4-P1)A1=(P2-P3)A2$$

$$(171.1-57.4)\text{psi sq. in.}=(416.4-364.1)\text{psi} \times A2.$$

$$113.7 \text{ psi sq. in.} = 52.3 \text{ psi}(A2)$$

$$A2=2.17 \text{ sq in.}$$

Thus, a mechanical advantage of at least 2.17 is required for the system depicted in FIG. 7 to operate if refrigerant R-134a is used on the compressive side and R-410a is used on the expansive side.

Again, implementing more suitable refrigerants having more appropriate vapor pressure properties relative to one another may produce greater chemical advantages. As previously described the mechanical advantage may further be enhanced by increasing the ratio of volume displacement by expander 717 relative to the volume displacement of compressor 716. For example, if A2 or the volume displaced by expander 717 were doubled, a total mechanical advantage of 4.34 would be observed.

In this system the compressor 716 draws refrigerant vapor from chamber 711 and compresses it into chamber/condenser 713a. The compressor 716 is power by the expander 717 which derives its energy from the difference of pressure between chamber 712 (evaporator) and chamber 713 (condenser). In addition, energy may be supplemented to the system through an augmentation device 743 as described earlier.

Again, this system may also utilize expansion valves (775a-b), pumps (741 and 742, respectively), sensor 788a-b and 3-way valve 766a-b to further promote evaporation of the refrigerant in chamber/evaporator 711 and 712, respectfully, as described earlier when referring to FIGS. 5a-b.

In yet another embodiment, using similar principles as illustrated in FIG. 7, may be implemented to provide power to a steam turbine or other means for the production of energy. In this embodiment both evaporator (chamber 712) and the evaporator (chamber 711) absorbs heat from solar reflectors, mirrors or other source of heat. The condenser (chamber 713) may be placed outside and expel heat to the ambient air or other cooling means and the condenser (chamber 713a) heats, piped in water 747. As the refrigerant in chamber 713a condenses, it gives off heat to the cool water 747 that is piped in, and continues heating the water 747 as it passes through condenser 713a. The heated water 747 is heated sufficiently to cause boiling of the water and create steam to power a turbine. The use of augmenting devise 543, 643 and 743 is optional and may or may not be used in connection with the embodiment relating to energy production Again, in both embodiments, referring to FIG. 7, and regarding heating water and powering a steam turbine, the two refrigerant system, may further be leveraged mechanically by increasing the ratio of volume displacement by expander 717 relative to the volume displacement of compressor 716.

Further, the embodiment of FIG. 7, described above, relating to powering a steam turbine, is not limited to using a two refrigerant system (chemical advantage) but both the expansive and compressive side of the system may be configured to use the same or a single type refrigerant and operate solely by using mechanical advantage to leverage the system. As previously described, mechanical leverage is achieved by configuring the volume displacement of the expansive side of the system be greater the volume displacement of compressor.

Figure 8:
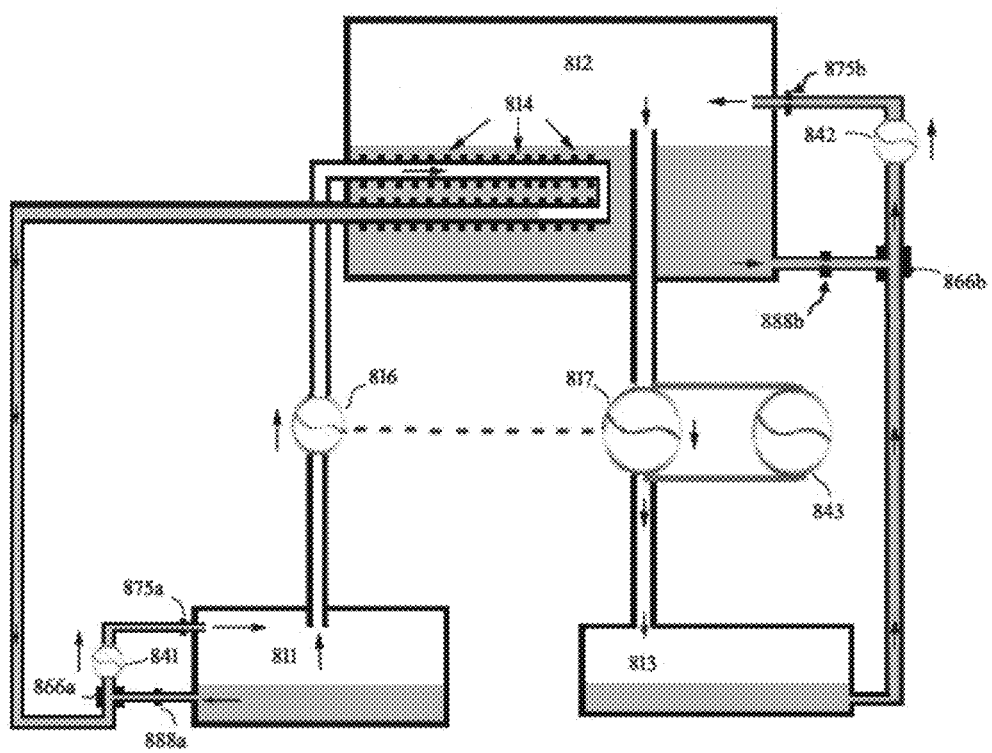
FIG. 8 illustrates a diagrammatic view of a mechanical advantage system configured to which the vapor generated in the evaporator in the compressive section is leveraged to a pressure level in which the temperature of the vapor reaches at least the temperature of that of the condenser in the evaporator in the expansive section, in accordance with other embodiments.

In accordance with other embodiments, FIG. 8 depicts a mechanical advantage system, using two refrigerants, in which the pressure of the refrigerant vapor generated in evaporator 811 is leveraged and stepped up, by chemically induced mechanical advantage, to a pressure level in which the temperature of the vapor reaches a temperature higher than that of the refrigerant liquid contained in evaporator 812. In effect the latent heat captured by the vapor generated in evaporator 811 is conserved and used to help boil the liquid refrigerant contained in evaporator 812.

This system comprises evaporator 812 that is in communication with expander 817 and condenser 813, containing a first refrigerant, (in this example R-410a is used). The system also, comprises evaporator 811 that is in communication with compressor 816 and condenser 813a, containing a second refrigerant, (in this example R-134a is used). Expander 817 is coupled to and powers compressor 816.

Condenser 814 is placed within evaporator 812. The refrigerant R-134a vapor generated in evaporator 811 is compressed by compressor 816 and is piped into the liquid phase R-410a refrigerant contained in evaporator 812. The piped compressed vapor transported into evaporator 812 acts as a condenser, (condenser 814), giving off heat to evaporator 812. As the compressed refrigerant R-134a vapor in condenser 814 condenses into a liquid, heat is given off and absorbed by the liquid refrigerant R-410a (contained in evaporator 812) causing the liquid refrigerant to boil and subsequently causing an increase in pressure in evaporator 812.

As described in previous examples, chemical mechanical advantage is achieved between expander 817 and compressor 816 by implementing the use of two refrigerants, in which each refrigerant, contained in the compressive side and expansive side of the system, has different vapor pressure properties from one another with respect to temperature. This system may also implement (in conjunction) the use of conventional mechanical advantage wherein the expansive turbine 817 displaces larger volumes of refrigerant than the compressive rotary turbine 816.

This embodiment is advantageous in that the latent heat absorbed by the vapor created in evaporator 811 is recycled back into evaporator 812 and its energy subsequently utilized to actuate expander 817 and ultimately power compressor 816. Additionally, condenser 613*a* of FIG. 6 is eliminated and replaced with condenser 814, hence, this system is simpler in design and is more economical to produce.

It should be noted that many other types of devises resulting in similar means may be used for this application and it is not the intent of this invention to be limited to the methods discussed here or elsewhere.

Many of the principles depicted and described earlier when referring to FIGS. 5*a-b*, and 6 are applicable and are similar to those described here in FIG. 8 and later as discussed in FIGS. 9. 10, 12 and 14. However, in this example the vapor generated in evaporator 811 is compressed by compressor 816 and piped into evaporator 812. The piped compressed vapor acts as a condenser 814 giving off heat to evaporator 812.

The augmenting device 843 has a multi-purpose in that it lowers the pressure, and thus, the boiling point of the refrigerant in evaporator 812, and augments the system to be pushed forward.

All other components depicted in FIG. 8 (augmenting devise 843, expansion valves 875*a-b*, sensors 888*a-b*, 3-way valves 866*a-b*, pumps 841 and 842, evaporator 811 and 812 condensers 813), have the same role and function as described earlier when referring to FIGS. 5*a-b* and 6.

Figure 9:
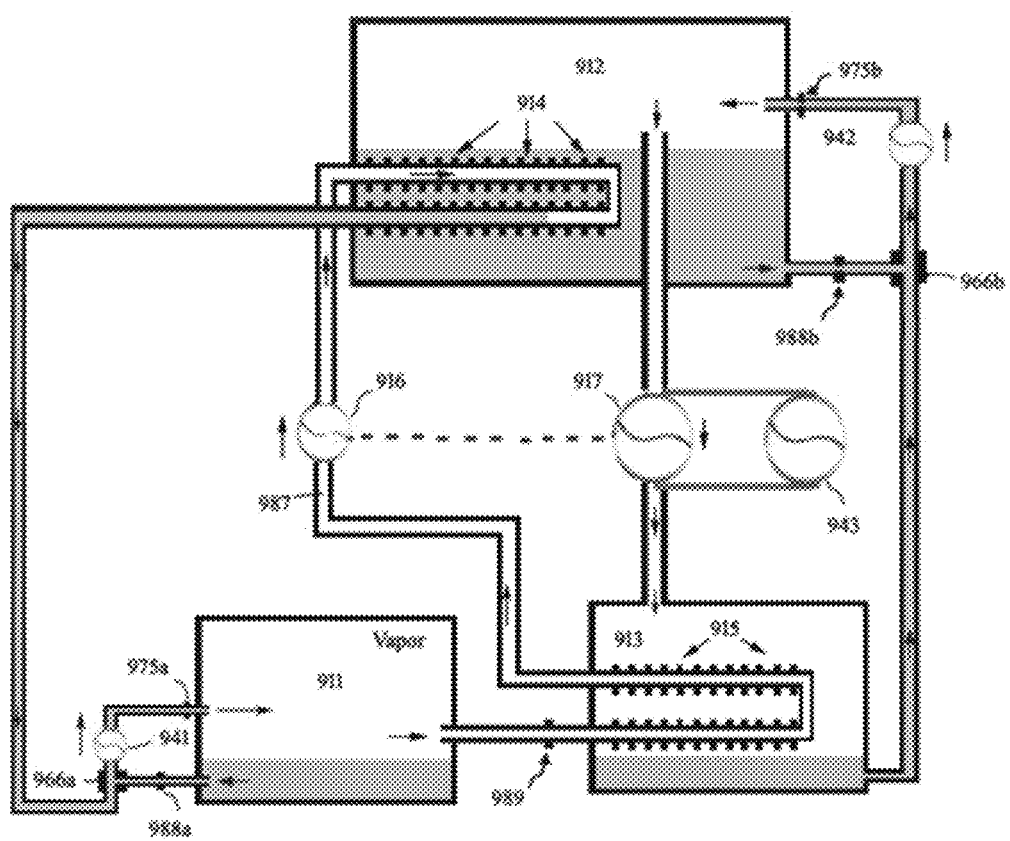
FIG. 9 illustrates a diagrammatic view of a mechanical advantage system configured in which the vapor generated in the evaporator in the compressive section is leveraged to a pressure level in which the temperature of the vapor reaches at least the temperature of that of the condenser and the evaporator in the expansive section, in accordance with other embodiments.

FIG. 9 depicts another embodiment very similar to that of the system described in FIG. 8. However, in this embodiment the vapor generated in evaporator 811 is first preheated before it is compressed into condenser 814.

Again for this example R-410a is used on the expansive side and R-134a is used in the compressive side.

Accordingly, the embodiment depicted in FIG. 9 the R-134a vapor generated in evaporator 911 is first piped and preheated through a conductive radiator 915 in which heat is absorbed from condenser 913. The preheated vapor 987 is then compressed by compressor 916 and is subsequently piped into condenser 914. Again, similar as to that described in FIG. 8. As the compressed refrigerant R-134a vapor in condenser 914 condenses into a liquid, heat is given off and absorbed by the liquid refrigerant R-410a (contained in evaporator 912) causing the liquid refrigerant R-410a to boil and subsequently causing an increase in pressure in evaporator 912 and ultimately more power to actuate expander 917.

An aspect of further conservation occurs as the vapor passes through conductive radiator 915. Condenser 913 becomes cooler as heat is absorbed from by the passing vapor. This cooling of condenser 913 creates a greater temperature differential between evaporator 912 and condenser 913. The greater temperature difference between evaporator 912 and condenser 913 creates a greater driving force upon expander 917 which in turn helps drive compressor 916.

In accordance with other embodiments, similar to that described in FIG. 8, FIG. 9 illustrates the pressure of the vapor generated in evaporator 911 is stepped up, by chemically induced mechanical advantage between expander 917 and compressor 916 and may be fortified by conventional mechanical advantage wherein the expansive turbine 917 displaces larger volumes of refrigerant than the compressive rotary turbine 916. External energy provided by motor 943 may also be used.

One-way valves and or pumps 989, may be placed where needed along the pathway of the piped vapor as it passes through conductive radiator 915 to prevent the heated vapor from back flowing.

All other components depicted in FIG. 9 (augmenting devise 943, expansion valves 975*a-b*, sensors 988*a-b*, 3-way valves 966*a-b*, pumps 941 and 942, evaporator 911 and 912 condensers 913), have the same role and function as described earlier when referring to FIGS. 5*a-b* and 6.

Figure 10:
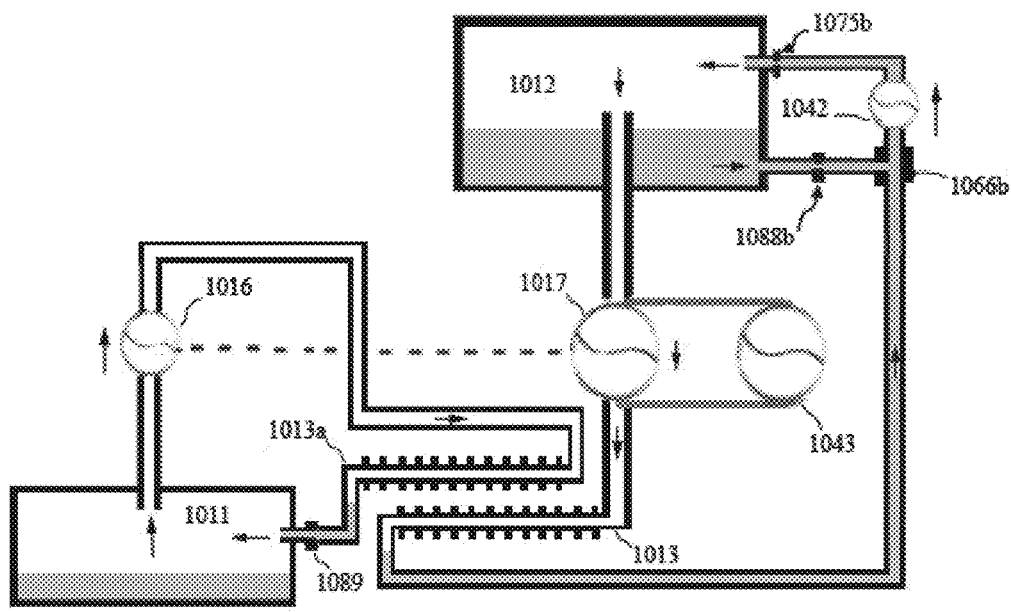
FIG. 10 illustrates a diagrammatic view of a mechanical advantage system configured in which the condenser in the compressive section exchanges heat with the condenser in the expansive section, in accordance with other embodiments.

FIG. 10 depicts a mechanical advantage system, in accordance with other embodiments, in which the system's efficiency is enhanced by allowing the condenser of the compressive section to absorb heat from the condenser of the expansive section. Again in this example and similarly, as previously described, evaporator 1012, expander 1017 and condenser 1013 of the expansive section contain R-410a and the evaporator 1011, compressor 1016 and condenser 1013*a* of the compressive section contain R-134a.

Again, similar to that described in previous examples, such that described in expander 617 in FIG. 6, expander 717 in FIG. 7, expander 817 in FIG. 8, expander 917 in FIG. 9, and described here in expander 1017 in FIG. 10, and described later in expander 1217 in FIG. 12 and in expander 1417 in FIG. 14, derives energy from the difference of pressure between evaporator 1012 and condenser 1013. The greater the pressure difference between evaporator 1012 and condenser 1013, the greater the force exerted upon expander 1017 and in turn a greater force exerted upon compressor 1016.

FIG. 10 illustrates an embodiment in which condenser 1013 and condenser 103*a* are being placed in close proximity to each other in order to facilitate the transfer of heat between the two condensers. When the transfer of heat occurs from condenser 1013 into condenser 1013*a*, condenser 1013 becomes cooler and simultaneously condenser 1013*a* becomes warmer.

As condenser 1013 becomes cooler there is (at least in part) a condensation of vapor of the refrigerant within condenser 1013. Consequently, there is a decrease of pressure within condenser 1013. The lowering of pressure in condenser 1013 has the effect of increasing the difference in pressure between evaporator 1012 and condenser 1013, thus producing a greater driving force acting upon expander 1017 and in turn a greater force powering compressor 1016. One way valves may be placed along the route of condenser 1013*a* to prevent the backflow of fluid as heat is absorbed by condenser 1013*a*.

The greater driving force acting upon compressor 1016 the greater is the is the ability for compressor 1016 to aspirate refrigerant vapor from evaporator 1011 and also a greater capability for compressing the refrigerant into condenser 1013*a*. The increased ability for compressor 1016 to reduce the pressure/temperature in evaporator 1011 provides for a greater cooling effect by evaporator 1011.

The embodiment described in FIG. 10 regarding the benefit of heat exchange between condenser 1013 and condenser 1013*a* may be implemented in applications in which the refrigerant contained in the compressive section and the refrigerant contained in the expansive section having different refrigerants. That is each refrigerant having different vapor pressure properties from one another with respect to temperature.

Additionally, a system having the same refrigerant in each of the compressive and expansive section and having the same vapor pressure properties may also benefit from this embodiment as discussed herein and related to FIG. 10.

In this example, FIG. 10 depicts the fluid within condenser 1013 and condenser 1013a flowing in the same direction. However, the system may be configured in a manner in which the fluid within condenser 1013 and condenser 1013a are flowing in a counter current direction.

Again as similarly described in earlier examples, This system comprises evaporator 1012 that is in communication with expander 1017 and condenser 1013, containing a first refrigerant, (in this example R-410a is used). The system also, comprises evaporator 1011 that is in communication with compressor 1016 and condenser 1013a, containing a second refrigerant, (in this example R-134a is used). Expander 1017 is coupled to and powers compressor 1016.

Similar to that described in FIG. 8 the pressure of the vapor generated in evaporator 1011 is stepped up, by chemically induced mechanical advantage between expander 1017 and compressor 1016 and may be fortified by conventional mechanical advantage wherein the expansive turbine 1017 displaces larger volumes of refrigerant than the compressive rotary turbine 1016. External energy provided by motor 1043 may also be used.

Regulator 1089 serves as a monitor to maintain proper pressure in condenser 1013a to adequately condense the vapor compressed by compressor 1016.

One-way valves and or pumps, may be placed where needed along the pathway of the piped vapor as it passes through condenser 1013 and condenser 1013a to prevent the heated vapor from back flowing. Again as described earlier, the pressure of the vapor generated in evaporator 1011 is stepped up, by chemically induced mechanical advantage between expander 1017 and compressor 1016 and may be fortified by conventional mechanical advantage wherein the expansive turbine 1017 displaces larger volumes of refrigerant than the compressive rotary turbine 1016. External energy may also be provided by motor 1043. One-way valves, may be placed where needed along the pathway of the piped vapor as it passes through conductive condenser 103a to prevent the heated vapor from back flowing.

Many other configurations may be implemented to achieve the same result. These are only examples are not intended to be limiting.

All other components depicted in FIG. 10 (augmenting devise 1043, expansion valves 1075a-b, sensors 1088a-b, 3-way valves 1066a-b, pump 1042, evaporator 1011 and 1012 and condensers 1013a and 1013), have the same role and function as described earlier when referring to FIGS. 5a-b and 6.

Presently in the industry, conventional air conditioning condensers consist of piped compressed vapor surrounded by thermal conductive fins and heat from the compressed vapor is expelled to the cooler outside temperature via thermo-conduction through the fins. A fan passing through the fins facilitates the process.

Figure 10B:
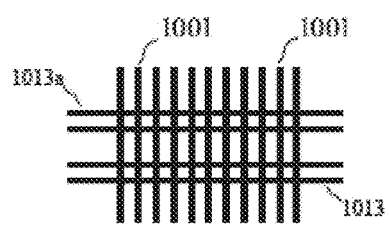
FIG. 10b illustrates a diagrammatic view of a system for heat exchange, in accordance with other embodiments.

FIG. 10b, illustrates a method of transferring heat from condenser 1013 to condenser 1013a according to another embodiment. This method involves configuring the cooler piped vapor generated in evaporator 1011 and contained in condenser 113a and the hotter piped vapor generated in evaporator 1011 and contained in condenser 1013 and passing both condensers through a series of heat conductive fins 1001. Each fin 1001 communicates and exchanges heat, by conduction, from the piped vapor of condensers 1013 and 1013a. The fins 1001 facilitate heat conduction from condenser 1013 onto condenser 1013a. As in the conventional system a fan passing through the fins facilitates the process.

Another example of conducting heat from condenser 1013 to 1013a involves configuring each condenser 1013 and 1013a in a circular fashion and one of the condensers 1013 or 1013a having a smaller circumference than the other and placing one condenser within the other. To facilitate heat transfer a fan passes air through both condensers.

Heat Collecting Conduit System: A great portion of the heat entering the living space of a house results from the direct rays of the sun. Due to the large surface areas of roofs, a great quantity of heat is absorbed from the direct exposure to the sun. Consequently, attic temperatures can reach substantially higher temperatures than the outside ambient air. Presently, the attic space serves as a buffer between the heat absorbed by the roof and the heat that ultimately penetrates the living area of a house.

What follows is the description of a solar heat colleting system that captures and concentrates heat from the roof. The collected heat, in conjunction with a refrigerant, is then used to fuel a mechanical leverage system.

The captured heat may be absorbed by a refrigerant, in a heat exchange coil system, located in evaporator (e.g., 612 in FIG. 6, 712 in FIG. 7, 812 in FIG. 8, 912 in FIG. 9, 1012 in FIG. 10) of the system (and also evaporator 1212 in FIGS. 12 and 1412 in FIG. 12. 1412 in FIG. 14 to be discussed below).

In general, the greater the temperature differential between the heat capturing system and the outside ambient air, the greater the power generated by the mechanical leverage system. In this respect, it is advantageous to maximize the quantity of heat captured from the sun and concentrate its intensity. This may be achieved, for example, by confining and limiting the volume of air, to the space between the rafters of a roof, such that the quantity of air to be heated becomes less, thus, greater temperatures can be reached. This smaller volume of air, when heated, reaches greater temperatures that are normally reached in attic spaces where the entire attic space is heated.

Figure 11A:
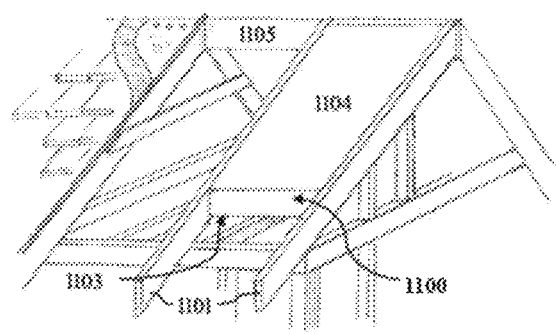
FIG. 11a shows the partial top-side perspective view of a house roof, which was modified to incorporate a heat collecting system, according to another embodiment.

A principal embodiment of the invention is to enclose the space between the rafters 1101 (see FIG. 11a, b) of a roof and convert them into longitudinally canals or conduit 1100. The canals follow the roof line and rise to the apex of the roof. The enclosure is achieved by affixing a panel 1103 (see FIG. 11a, b) across the bottom portion of the rafters 1101, resulting in a conduit or canal 1100 for the transport of warm air. The resultant enclosed space is bounded by the roof sheeting 1104 on the top side and the panel 1103 on the bottom side and by the rafters 1101 on each lateral side. The panels 1103 are preferably composed of a material that is rigid enough to cover the bottom portion of the rafters without sagging. In addition, it is preferred that the panels 1103 have a heat barrier component that is composed of an isolative material that will impede the heat from the conduit 1100 from transfer into the attic space.

Thus, when the rays from the sun heat the roof 1104, the heat from the roof then transfers into the canal system 1100 and warms the air between the rafters 1101. The heated air, within the canals 1100, rises by convection and a fan 1210 (to be discussed below in FIG. 12) and is thus swept upward along the pitch of the roof towards the apex and ridge board 1105.

Figure 11B:
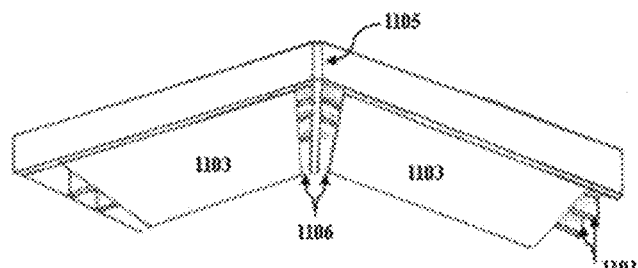
FIG. 11b depicts the bottom-front perspective view of the house roof from FIG. 11a FIG. 11c depicts the house roof from FIG. 11b further including air conduits.
Figure 11C:
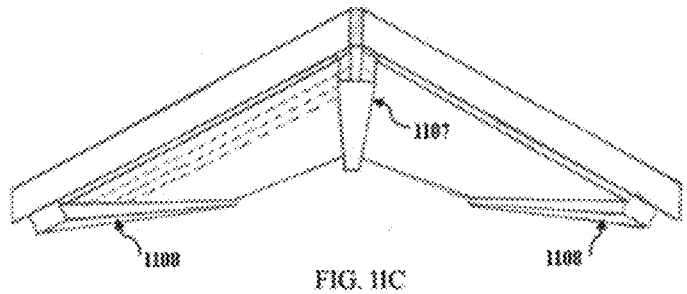

Again, the isolative panels 1103 are affixed and cover the lower portion of the rafters 1101. However, a space/opening 1106 of about 3 to 4 inches is left open before reaching the ridge board 1105 (See FIG. 11*b*). An encasing duct 1107 (FIG. 11*c*) is placed and affixed to the panels on each side of the ridge board, in that it runs parallel to the ridge board and perpendicular to the rafters. The encasing duct 1107 straddles the ridge board 1105 and both panels 1103 on each side of the ridge board as well as both openings 1106 between the ridge board and panels in that it allows air rising from between the rafters to enter the encasing duct. In this manner, the canals 1100 between the rafters act as tributary canals, for heated air, and the encasing duct 1107 acts as a collective mainstream duct. The openings 1106 are sufficiently large to allow air to flow from the tributary canals 1100 to the mainstream duct 1107.

As the main stream duct 1107 collects heated air from the tributary canals 1100, it transports it to one end of the ridge line and the heated/warm air is passed through an evaporator box 1209 (see FIG. 12), containing an evaporator 1212 and a fan 1210. Warm air from the mainstream duct 1207 is fanned by fan 1210 across the evaporator 1212 (i.e., evaporator of a mechanical leverage/advantage system), causing the refrigerant in the evaporator 1212 to boil. The boiling refrigerant absorbing heat from the warm air is used to power the mechanical advantage system.

A limiting factor for running the mechanical advantage system is having adequate and an abundant volume of refrigerant vapor (produced by evaporator 1212) to power expander 1217. By recirculating the air that has passed through evaporator 1212 and recovering its residual heat and then re-heating the air, substantially increases the amount of heat passing through evaporator 1212 and thus improves the volume of refrigerant vapor produced by evaporator 1212.

Figure 12:
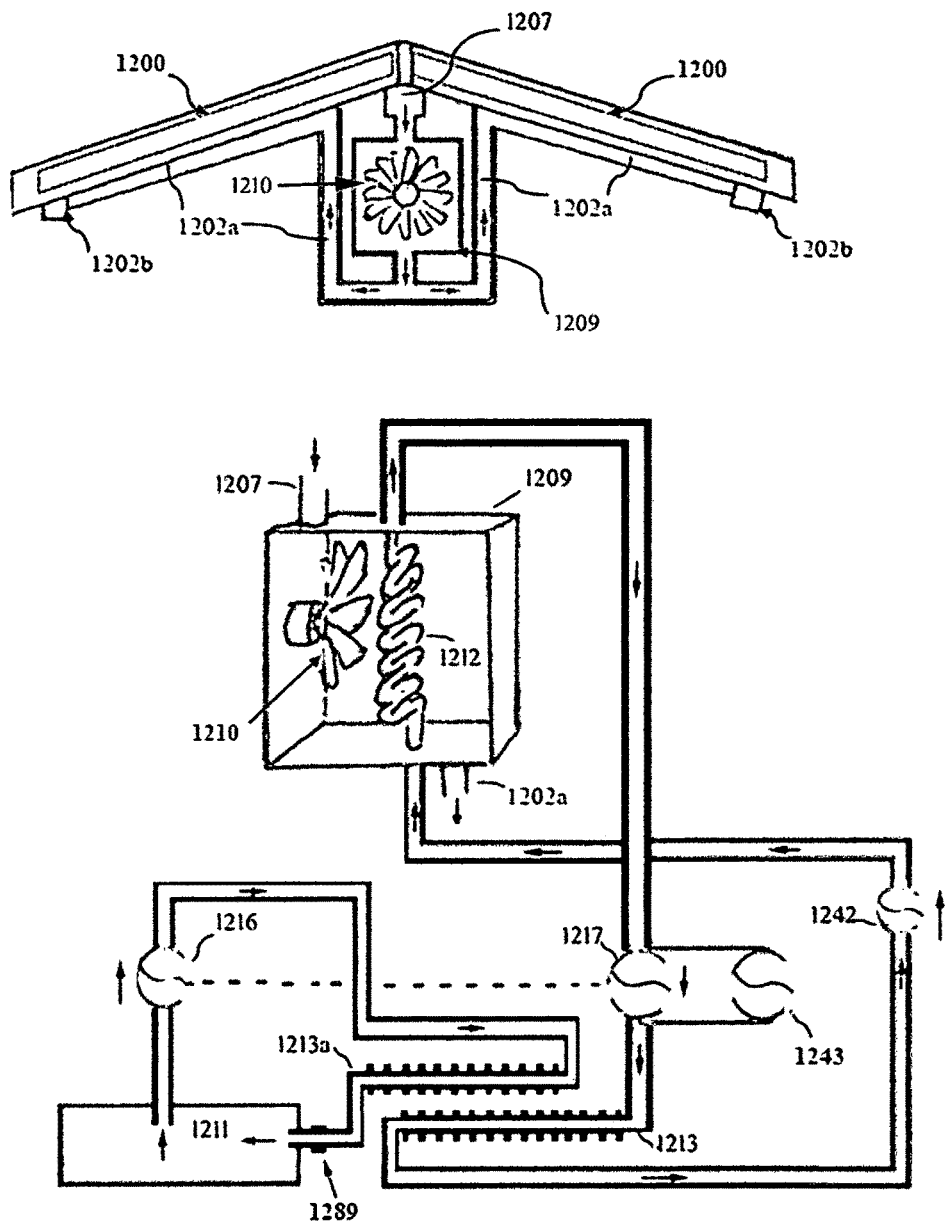
FIG. 12 depicts the front view of the house roof from FIG. 11c further including additional air conduits and an evaporator box and a mechanical leverage system for an air conditioner.

The following example is a discussion of FIG. 12 and is modeled after that described earlier in FIGS. 6 and 10 (however, any mechanical leverage system using refrigerants may benefit from this embodiment). As evaporator 1212 consumes the heat from the mainstream duct 1207, the absorption of heat causes the refrigerant in evaporator 1212 to boil. The resultant vaporization and expansion of the refrigerant may be coupled to an expander 1217. The exhaust vapor is channeled into condenser 1213. Next, the exhaust vapor is condensed by a cooling source (in this example condenser 1213*a*, at least in part) or cooler air from the outside. The expansion of gas within evaporator 1212 coupled with the condensing of the gas in condenser 1213 produces a pressure difference, which powers expander 1217. The energy derived from expander 1217 in turn may be leveraged and stepped up to run, (in this example compressor 1216 of an air conditioner). However, other systems may be powered such as: compressors in general, heating pumps used for water heaters or other heating applications, electricity generator, and so on.

It is noted that the refrigerant contained in the expansive section, consisting of: evaporator 1212, expander 1217 and condenser 1213 and the refrigerant in the compressive section, consisting of: evaporator 1211, compressor 1216 and condenser 1213*a* may contain the same refrigerant (see FIG. 14, discussed below). That is to say that the vapor pressure
properties of the refrigerant contained in the compressive section and expansive section may be the same.

Alternatively, the refrigerant in the contained in the compressive section and expansive section or may be different from one another, having different vapor pressure properties.

The heat exchange system described in FIG. 10*b* may also be incorporated in FIG. 12 (not shown here in order to simplify the drawing). Wherein, heat exchange from condensers 1213 and 1213*a* is facilitated by heat conductive fins.

Again as previously described in (FIGS. 6 and 10), the pressure of the vapor generated in evaporator 1211 is stepped up, by chemically induced mechanical advantage between expander 1217 and compressor 1216 and may be fortified by conventional mechanical advantage wherein the expansive turbine 1217 displaces larger volumes of refrigerant than the compressive rotary turbine 1216. External energy may be provided by motor 1243.

One-way valves and or pumps 989, may be placed where needed along the pathway of the piped vapor as it passes through condenser 1213*a* to prevent the heated vapor from back flowing.

All other components depicted in FIG. 12 (augmenting devise 1243, expansion valves 1275*a-b*, sensors 1288*a-b*, 3-way valves 1266*a-b*, pumps 1241 and 1242, evaporator 1211 and 1213 condensers 1213*a*), have the same role and function as described earlier when referring to FIGS. 5*a-b* and 6. Some components may not be shown here in order to simplify the drawings.

Recycling the Air Exiting the Evaporator

Again, the warm air that has passed through the evaporator 1212 (see FIG. 12) becomes cooler than the warm air that entered the evaporator box 1209 from the mainstream duct 1207. However, the air that has passed through the evaporator 1212 still contains useful residual heat and its temperature is usually still about 10-15 degrees F. higher than that of the outside air. Thus, rather than expelling this residual warm air to the outside, it would be economically more desirable to recycle the air by diverting it back from evaporator box 1209 into the tributary canals 1200, through recycling conduits or return duct/conduit 1202*a* and 1202*b*, to be reheated again. The returning air is reheated by the sun as it is recycled back thru the tributary canals 1200. With the use of fans 1210 or other fans placed where needed (not shown) and a duct/conduit system, the air passing through the evaporator 1212 may be rerouted back into the lower portion of the tributary canals 1200 via return conduits 1202*a* and 1202*b*.

Figure 13A:
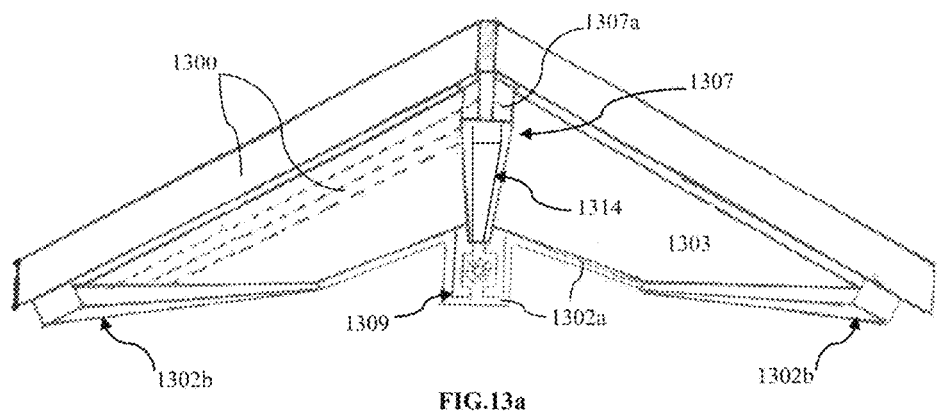
FIG. 13a depicts the bottom-back perspective view of the house roof from FIG. 12.

The return conduit 1302*b* (see FIGS. 13*a*, 13*b*, 13*c*) and (1202 FIG. 12) is perforated (see 1302*b* in FIG. 13*c*) on the top surface releasing recycled air back into the tributary canals 1300. As shown in FIG. 13*c*, the perforations 1313 (proximal the evaporator box 1309) become gradually closer together as they progress from 1302*ba* towards the distal end 1302*bb* of the return conduit 1302*b* as it approaches the tributary canals furthest away from evaporator box 1309. In this respect, the further spaced perforations 1313 at the proximal end 1302*ba*, release less amounts of air in the tributary canals that are positioned near the evaporator box 1309, thereby, slowing down the rate of air flow in the most proximal tributary canals, and thus, allowing more time for the air to be heated before reaching the mainstream duct 1307. As the return conduit 1302*b* reaches the furthermost tributary canals, the perforations become closer together, allowing greater quantities of air to exit and enter the tributary canals 1300, hence there is a greater rate of flow of air into the tributary canals 1300. At the far end 1302*bb* of the return conduit 1302*b* all the remaining air flows into the last tributary canal and ultimately into the mainstream duct 1307. The recycled air picks up heat from the inflow of the other tributary canals, as it travels through the mainstream duct 1307 back to the evaporator box 1309, and thus, to evaporator 1312. Additionally, (to optimize heating) the recycled air may be diverted to the return conduit 1302*b* that is most exposed to the sun by closing off or diminishing the circulation of air (for example, at duct 1302*a*) to the return conduit 1302*b* on the side that has less exposure to the sun.

Figure 13B:
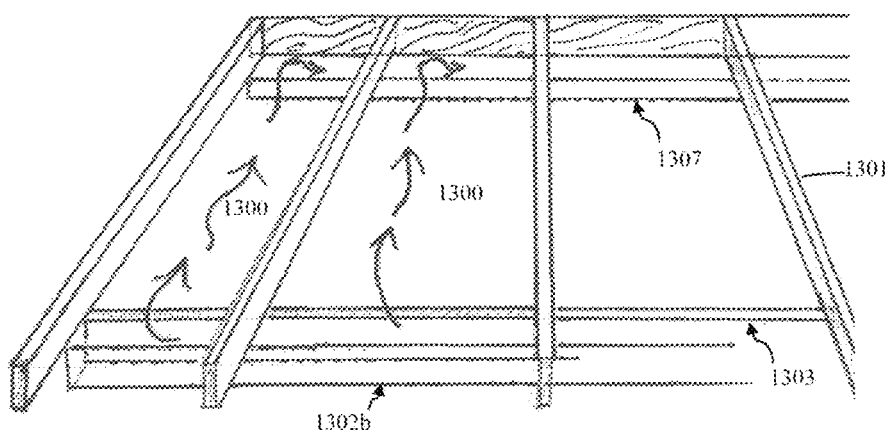
FIG. 13b depicts the partial side perspective view of the house roof from FIG. 13a, having the roof sheeting removed for illustration purposes.
Figure 13C:
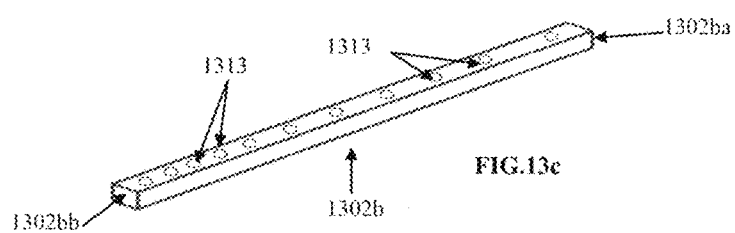

For purposes of illustration the roof sheathing has been removed in FIG. 13*b*. This illustration depicts the system described above for reheating air that has passed through the evaporator. Again, fans where needed (not shown) force air through the return ducts 1302*b* into the tributary canals 1300 and back into the mainstream duct 1307.

Again, the enclosing bottom sections of the tributary canals system are comprised of panels 1303 (see FIG. 13*a*) that are preferably of manageable lengths and widths for easy assembly, and that attach and run longitudinally below and abutting the rafters 1301. More preferably, each panel of the canal system is pre-manufactured to dimensions that fit snugly on the bottom portion of the rafters enclosing the space between the rafters. In most cases, the rafters are spaced apart at 24 inches from rafters' center. Thus, the panels will preferably be 24 inches wide. The bottom portion of the panels may contain flanges or other means of affixing the panels with staples or nails to the bottom portion or sides of the rafters.

Again, the panels may be pre-manufactured at manageable lengths and widths to allow them to be cut and refitted end-to-end with the use of inserts. Cutting and rejoining the segments may achieve the desired lengths of the panels. As stated earlier, the panels are composed of a thermally isolative material, and preferably also of a fire retardant material.

It should be noted that the heat that would normally accumulate in the attic and ultimately penetrate the living space of a house is diverted into the evaporator box 1209 (FIG. 12) and absorbed by the evaporator 1212. Consequently, a great portion of the heat absorbed by the roof never has an opportunity to penetrate and heat the inside of the living space. In this regard, the work/energy required to cool the house is greatly diminished, and thus, this is another advantage of this heat collecting system. Furthermore, heat absorbed by the roof is normally unwanted and vented to the outside. However, utilizing this system, heat becomes useful and valuable; thus, the roof vents are preferably closed off.

If the goal was solely to cool the attic space, vents may be opened to allow warm air to escape and the compressor portion or any other load of the system maybe disengaged or made nonexistent. In this instance, evaporator 1212 (in FIG. 12) will absorb heat from the attic or tributary canals and expel the heat to the outside via condenser 1213. As the system continues to run, the temperature of the attic will tend to equilibrate and approximate the temperature of the outside until they become nearly equal.

The greater the mechanical advantage of the system, either through chemically induced advantage or traditionally mechanical advantage (referring to the difference of volume displacement between expander and compressor) the greater heat that is displaced by expander 1217, and the cooler the air in the heat collecting system becomes. Consequently, the lower temperatures of the tributary canals increases the rate of heat absorption from the sun and ultimately a greater quantity of total heat is absorbed (hence energy) into the system.

The roofing material preferably should have the properties that readily absorbs and conducts heat. Materials of dark colors or materials composed of metal or glass are quite suitable.

The heat collecting system is especially useful with vaulted ceilings where attic space is limited. The principle of heat collecting canals may also be integrated in roofing tiles. The tiles may be configured to interlock with one another and the canals within each tile may be aligned as to allow the flow of heated air from one tile to the other and ultimately to a mainstream duct placed close to the ridge board as described above.

Another application of the heat collecting system is its utilization with sun-exposed walls. In this application portholes or tubing are placed in the fire stops between the outside wall and the interior wall of the building. Heated air is drawn from between the walls and fed into the mainstream duct. Furthermore, the same principle may be applied to extract heat from within double paned windows or any other heat source.

Figure 14:
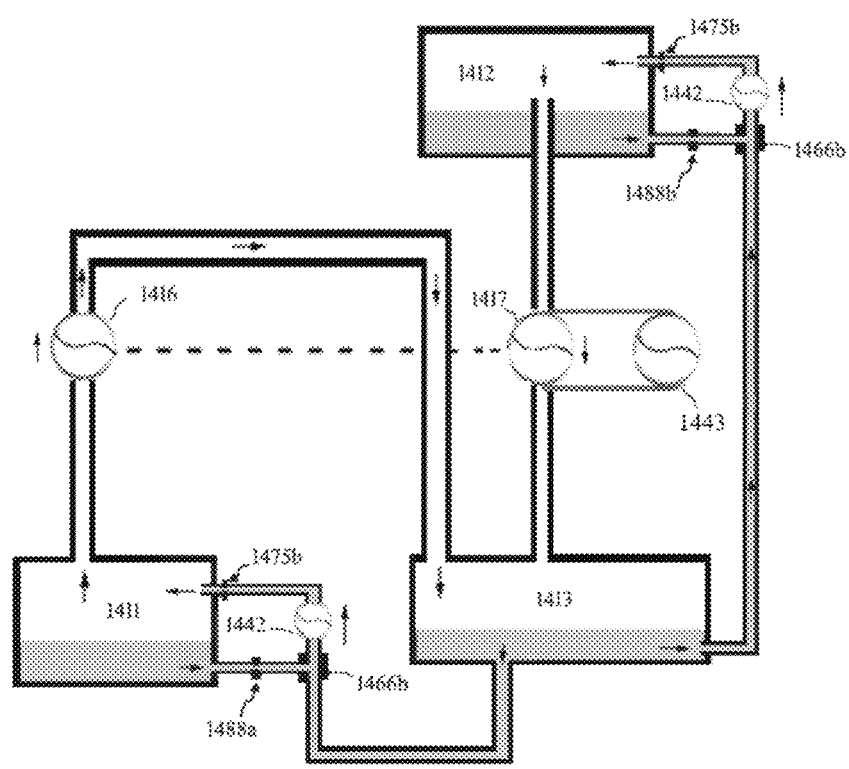
FIG. 14 illustrates a diagrammatic view a mechanical leverage system for an air conditioner using 1 refrigerant, in accordance with other embodiments.

FIG. 14 describes an embodiment related to that described in FIG. 12. Presently FIG. 12 depicts a mechanical advantage system having 2 refrigerants (with different vapor pressure properties) in each the expansive and compressive sections. However, in this example the mechanical leverage system is substituted with a system having a single refrigerant in both the expansive and compressive sections, and described in FIG. 12.

Again as described earlier in FIG. 12, similarly evaporator 1412 consumes the heat from the mainstream duct 1207 (see FIG. 12), the absorption of heat causes the refrigerant in evaporator 1412 to boil. The resultant vaporization and expansion of the refrigerant may be coupled to an expander 1417. The exhaust vapor is channeled into condenser 1413. Next, the exhaust vapor is condensed by a cooling source, causing a decrease in the volume and pressure of gas. The expansion of gas evaporator 1412 coupled with the condensing of the gas in condenser 1413 produces a pressure difference, which powers expander 1417. The energy derived from expander 14217 in turn powers, (in this example the compressor 1416 is that of an air conditioner). Compressor 1416 aspirates refrigerant from evaporator 1411 and compresses the refrigerant vapor into condenser 1413 and is condensed by giving off heat to a cooling source, example to the outside ambient air.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the present invention. Therefore, the scope of this application is intended to cover alternate embodiments and/or equivalent variations of the specific embodiments illustrated and/or described herein. Hence, the scope of the present invention is defined by the accompanying claims and their equivalents. Furthermore, each and every claim is incorporated as further disclosure into the specification and the claims are embodiment(s) of the present invention.

What is claimed is:

1. A heat collecting system, wherein, said heat collecting system is configured to collect and concentrate solar energy that has penetrated the roof of a building and comprises: a plurality of tributary canals, in which solar heat is absorbed, and positioned substantially parallel with the building roof's slope such that the higher ends of said tributary canals are in the proximity of the ridge board of the roof; a mainstream duct that collects hot air arriving through the higher ends of said tributary canals; an evaporator box for housing a first evaporator and placed at one end of the mainstream duct;

and a fan that pulls the hot air from the tributary canals and into the mainstream duct and pushes it onto said first evaporator, and, wherein said first evaporator constitutes part of an expansive side, wherein, said expansive side containing a first refrigerant and comprises an expander which is in controlled fluid communication with said first evaporator and a first condenser, wherein, said first evaporator absorbs heat from said heat collecting system and said first evaporator acts as a power system, and, said first evaporator is configured to generate a gas-phase from a liquid-phase of said first refrigerant, resulting in an increase in pressure in said first evaporator, and said first condenser is configured to expel heat to a cooling source, and generate a liquid phase from a gas-phase of said first refrigerant, resulting in a decrease in pressure in said first condenser, wherein, the resultant difference in pressure between said first evaporator and said first condenser drives said expander, and in turn said expander provides power to a compressor, and wherein a pump is provided for delivery of liquid phase of said first refrigerant from said first condenser to said first evaporator.

2. The heat collecting system of claim 1, wherein the space of said tributary canals are bounded by the rafters of the roof on each side by a thermally insulated panel at the bottom and by the roof at the top.

3. The heat collecting system of claim 2, wherein the hot air that passes through said first evaporator, still containing a useful heat, is recycled back and rerouted to the lower portion of said tributary canals, and passing through and exiting the top portion of said tributary canals and into said mainstream duct and back through said evaporator.

4. The heat collecting system of claim 3, wherein solar heat is absorbed by the air as it passes through said tributary canals.

5. The heat collecting system of claim 1, in an air conditioning operation, comprising a compressive side, said compressive side containing a second refrigerant, wherein, said compressive side comprises the compressor which is in controlled fluid communication with a second evaporator and a second condenser, said first refrigerant and said second refrigerant, with respect to temperature, produce different vapor pressure behaviors from one another, wherein, the resultant difference in pressure between said first evaporator and said first condenser drives said expander, and thus, said compressor to which said expander is connected; and wherein said second evaporator is configured for absorbing heat from inside of the building and generating a gas-phase from a liquid-phase of said second refrigerant, and, further said compressor is configured to compress gas-phase of said second refrigerant generated in said second evaporator into said second condenser, and said second condenser is configured to expel heat to the outside of the building, and generate a liquid-phase from a gas-phase of said second refrigerant and wherein there is a difference between the vapor pressure properties of said first refrigerant used in said expansive side and said second refrigerant used in said compressive side such that a mechanical advantage, to power said compressor, is created between said expander and said compressor based on the difference in pressure between said first evaporator and said first condenser in said expansive side as compared to the difference in pressure between said second evaporator and said second condenser in said compressive side; such that said mechanical advantage is induced by the difference in the vapor pressure properties of said first refrigerant and said second refrigerant and wherein liquid phase of said second refrigerant is delivered from said second condenser to said second evaporator.

6. The heat collecting system of claim 5, wherein said expander and said compressor displace different volumes of refrigerant to create a mechanical advantage to the compressor.

7. The mechanical advantage system of claim 5, wherein said first condenser transfers heat to said second condenser.

8. The heat collecting system of claim 5, wherein said second condenser transfers heat to said first evaporator.

9. The heat collecting system of claim 5, wherein said second refrigerant absorbs heat from said first condenser.

10. The heat collecting system of claim 5, wherein energy is coupled to at least one member of the group consisting of said expander and said compressor.

11. The heat collecting system of claim 5, wherein at least one member of the group consisting of said expander and said compressor is comprised of a rotary assembly.

12. The heat collecting system of claim 5, in a heat exchange system, wherein a piped vapor of said first condenser and said second condenser are in communication with a series of thermo-conductive fins, such that as the fluid travels within said first condenser and said second condenser, heat is conducted through the fins and an exchange of heat between said first condenser and said second condenser occur.

13. The heat collecting system of claim 1, in an air conditioning operation, comprising a compressive side, said compressive side containing a second refrigerant, wherein, said compressive side comprises the compressor which is in controlled fluid communication with a second evaporator and a second condenser, said first refrigerant and said second refrigerant having similar vapor pressure behaviors with respect to temperature, wherein, the resultant difference in pressure between said first evaporator and said first condenser drives said expander, and thus, said compressor to which said expander is connected; and wherein said second evaporator is configured for absorbing heat from inside of the building and generating a gas-phase from a liquid-phase of said second refrigerant, and, further said compressor is configured to compress gas-phase of said second refrigerant generated in said second evaporator into said second condenser, and said second condenser is configured to expel heat to the outside of the building, and generate a liquid-phase from a gas-phase of said second refrigerant, wherein said expander and said compressor displace different volumes of refrigerant to create a mechanical advantage to power said compressor and wherein liquid phase of said second refrigerant is delivered from said second condenser to said second evaporator.

14. The heat collecting system of claim 13, wherein said first condenser and said second condenser are combined as one.

15. The heat collecting system of claim 13, wherein said first condenser transfers heat to said second condenser.

16. The heat collecting system of claim 13, wherein energy is coupled to at least one member of the group consisting of said expander and said compressor.

17. The heat collecting system of claim 13, wherein at least one member of the group consisting of said expander and said compressor is comprised of a rotary assembly.

18. The heat collecting system of claim 13, in a heat exchange system, wherein a piped vapor of said first condenser and said second condenser are in communication with a series of thermo-conductive fins, such that as the fluid travels within said first condenser and said second condenser, heat is conducted through the fins and an exchange of heat between said first condenser and said second condenser occur.

19. The heat collecting system of claim 1, wherein at least one member of the group consisting of said expander and said compressor is comprised of a piston cylinder assembly.

20. A mechanical leverage system, in an air conditioning operation, comprising a compressive side and an expansive side, said compressive side containing a first refrigerant and said expansive side containing a second refrigerant, and, with respect to temperature, said first refrigerant and said second refrigerant produce different vapor pressure behaviors from one another, wherein, said compressive side comprises a compressor which is in controlled fluid communication with a first evaporator and a first condenser, wherein, said expansive side comprises an expander which is in controlled fluid communication with a second evaporator and a second condenser, wherein, said second evaporator absorbs heat that has penetrated the roof of a building and acts as a power system, and, said second evaporator is configured to generate a gas-phase from a liquid-phase of said second refrigerant, resulting in an increase in pressure in said second evaporator, and said second condenser is configured to generate a liquid phase from a gas-phase of said second refrigerant, resulting in a decrease in pressure in said second condenser, wherein, the resultant difference in pressure between said second evaporator and said second condenser drives said expander, and thus, said compressor to which said expander is connected; and wherein said first evaporator is configured for absorbing heat from inside of the building and generating a gas-phase from a liquid-phase of said first refrigerant, and, further said compressor is configured to compress gas-phase of said first refrigerant generated in said first evaporator into said first condenser, and generate a liquid-phase from a gas-phase of said first refrigerant, wherein said first condenser is located within said second evaporator for heating said liquid phase of second refrigerant and causing said second refrigerant to boil, thereby contributing energy to said second evaporator to drive said expander; and wherein there is a difference between the vapor pressure properties of said first refrigerant used in said compressive side and said second refrigerant used in said expansive side; such that mechanical advantage is created between said expander and said compressor to power said compressor, based on the difference in pressure between said first evaporator and said first condenser in said expansive side as compared to the difference in pressure between said second evaporator and said second condenser in said compressive side; such that said mechanical advantage is induced at least in part by the difference in the vapor pressure properties of said first refrigerant and said second refrigerant; and wherein liquid phase of said first refrigerant is delivered from said first condenser to said first evaporator, and a pump is provided for delivery of liquid phase of said second refrigerant from said second condenser to said second evaporator.

* * * * *